United States Patent [19]

Potts et al.

[11] 4,067,836

[45] Jan. 10, 1978

[54] ENVIRONMENTALLY DEGRADABLE COMPOSITIONS EXPOSED TO ACTINIC OR IONIZING RADIATION AND PROCESS

[75] Inventors: James Edward Potts, Bernards Township, N.J.; Stephen Watson Cornell, Naperville, Ill.; Albert Martin Sracic, Gladstone, N.J.

[73] Assignee: Union Carbide Corporation, New York, N.Y.

[21] Appl. No.: 606,062

[22] Filed: Aug. 20, 1975

Related U.S. Application Data

[63] Continuation-in-part of Ser. No. 267,255, June 28, 1972, Pat. No. 3,935,141, which is a continuation-in-part of Ser. No. 184,206, Sept. 27, 1971, abandoned.

[51] Int. Cl.$^2$ .................................................. C08J 3/20
[52] U.S. Cl. ............................ 260/23 H; 260/23 AR; 260/23 S; 260/31.2 R; 260/32.8 A; 260/33.2 R; 260/33.6 PQ; 260/45.7 S; 260/45.7 P; 260/45.9 R; 260/45.9 NC; 260/45.95 L; 260/45.85 B; 260/DIG. 43; 204/159.14; 526/1; 526/4; 526/5
[58] Field of Search .........260/23 H, DIG. 43, 23 AR, 260/23 S, 31.2 R, 32.8 A, 33.2 R, 33.6 PQ, 45.7 S, 45.7 P, 45.9 R, 45.9 NC, 45.95, 45.85; 526/1, 4, 5; 204/159.14

[56] References Cited

U.S. PATENT DOCUMENTS

| | | | |
|---|---|---|---|
| 2,984,641 | 5/1961 | Wolinsky | 260/41 R |
| 3,341,357 | 9/1967 | Feild | 260/DIG. 43 |
| 3,349,018 | 10/1967 | Potts | 260/DIG. 43 |
| 3,454,510 | 7/1969 | Newland et al. | 260/41 R |
| 3,575,904 | 4/1971 | Clarke | 260/23 AR |
| 3,592,792 | 7/1971 | Newland et al. | 260/41 R |
| 3,676,401 | 7/1972 | Henry | 260/63 |
| 3,825,626 | 7/1974 | McGaugh | 260/897 A |
| 3,825,627 | 7/1974 | McGaugh | 260/897 A |

OTHER PUBLICATIONS

Chemical & Engineering News, Guillet, May 11, 1970, p. 61.
"Polyethylene" by Raff et al., p. 99, Interscience Publ., N.Y. 1956.
"Antioxidation and Antioxidants" by Lundberg, vols. I & II, Interscience Publ., N.Y. 1964.
"Mechanisms of Oxidation of Organic Compounds"]by Waters, John Wiley & Sons, N.Y. 1964, pp. 13–14.
Machine Design, May 31, 1973, pp. 76–80, Sprow.

*Primary Examiner*—Eugene C. Rzucidlo
*Attorney, Agent, or Firm*—James J. O'Connell

[57] ABSTRACT

An environmentally degradable polymer based composition which has been exposed to actinic or ionizing radiation and which comprises an ethylene polymer base resin, and a synergistic combination of an autooxidative polymer or low molecular weight organic compound, certain polyvalent metal salts, and an antioxidant additive for the ethylene polymer; and a process for making such composition.

43 Claims, No Drawings

ENVIRONMENTALLY DEGRADABLE COMPOSITIONS EXPOSED TO ACTINIC OR IONIZING RADIATION AND PROCESS

CROSS REFERENCES TO RELATED PATENT APPLICATIONS

This patent application is a continuation-in-part of patent application Ser. No. 267,255 filed June 28, 1972 which was a continuation-in-part of Ser. No. 184,206, filed Sept. 27, 1971, said application Ser. No. 184,206 being now abandoned, and said application Ser. No. 267,255 having issued as U.S. Pat. No. 3,935,141.

This invention relates to ethylene polymer compositions. Specifically this invention relates to an ethylene polymer composition which when exposed to the elements of the environment undergoes degradation.

It has been made dramatically apparent that the huge volume of plastic products used by industry and the consumer has resulted in a significant disposal problem. All too often many plastic products, after the use by the ultimate consumer, become litter.

Over the course of the past several decades, in an effort to meet consumer demands, the plastics industry has made such plastic products more stable and as a consequence littered articles have an increased durability. With the presence of these stable plastic systems and with the advent of the awareness of the ecological needs of society solutions to the litter problem are now being sought.

While it was known and disclosed in U.S. Pat. No. 3,454,510 that certain pro-oxidant metal salts in polyolefin films, specifically mulch films, would render same environmentally degradable, that disclosure was inherently limited to opaque films.

It was further disclosed in U.S. Pat. Nos. 3,320,695 and 3,341,357 that certain unsaturated hydrocarbons could be added to opaque polyolefin films to promote degradation. These opaque films, also used in mulching operations, would require relatively large weight percentages of certain unsaturated hydrocarbons which resulted in a "soft" product; that is one not normally considered suitable for consumer product application.

There is described herein an ethylene polymer composition, suitable for fabrication of translucent to transparent consumer-type plastic products, which composition retains its structural stability during its normal useful life and when discarded to the environment the ambient environmental elements cause the plastic composition to degrade. The degradation reaction of the ethylene polymer composition occurs at a significantly faster rate after exposure thereof no natural or artificial actinic light.

The ethylene polymer composition of this invention, comprising the combination of both an auto-oxidative susceptible organic additive and a polyvalent transition metal salt in an ethylene polymer, is a product which has been found to undergo weathering at a greater rate than a similar product containing the equivalent amounts of only the auto-oxidative susceptible organic additive or only the polyvalent transition metal salt. The compositions can include the conventional additives such as fillers, pigments, slip agents, antioxidants, antistats, antiblocks, antifogs, or other materials conventionally added to ethylene polymers.

In certain cases it has been found that the combination of moderate amounts of both an auto-oxidative susceptible organic additive and a polyvalent transition metal salt in an ethylene polymer yields faster weathering rates than equivalent or larger amounts of either one of the individual components alone added to the same ethylene polymer.

It has been found that products formed with the ethylene polymer compositions of this invention will, when exposed to weathering, undergo high levels of multifaceted crazing, followed by cracking and ultimately resulting in particulate formation. With further passage of time the crazing continues on the particulates formed resulting in more and finer particulates. No additional external physical forces are necessary to cause the particulate formation although such external physical forces can aid in the "sloughing off" of the outer particulate layers to expose a new surface to the environment.

Broadly speaking this invention is an environmentally degradable ethylene polymer composition of (i) an ethylene polymer base resin, and as a synergistic combination of additives, (ii) an auto-oxidative susceptible additive as a polymer or low molecular weight organic compound and (iii) a polyvalent transition metal salt; there can also be present (iv) a stabilizer or antioxidant for the ethylene polymer. As used in this specification the term "ethylene polymer composition" has this broad meaning.

In more specific terms the ethylene polymer composition of this invention contains (i) an ethylene polymer base resin, and as a synergistic combination of additives, (ii) a polymer wherein the predominance of the mer units have, or a low molecular weight organic compound that has, at least one hydrogen bonded to a carbon atom having an auto-oxidative suscepibility greater than that of a hydrogen bonded to a normal secondary carbon atom, (iii) an organic salt of a polyvalent metal wherein at least one metal is a transition metal wherein electron transfer occurs in the 3d or 4f sub-shell and (iv) an organic antioxidant for the ethylene polymer.

In even more specific terms the ethylene polymer composition of this invention contains polyethylene, polyether or polypropylene, an organic salt of a polyvalent transition metal wherein the metal can be iron, manganese, zinc or cobalt, and an antioxidant such as the sterically hindered phenols, aryl amines, thioureas, thiocarbamates, phosphites and thioether esters.

Antioxidants for ethylene polymers have been found useful to stabilize the ethylene polymer compositions so as to provide compositions whereby the period required before embrittlement occurs may be "built into the composition." This aspect of the invention is of course valuable insofar as one knowing the normal useful life (period before disposal) of an article, could proportion the amounts of antioxidant and additives to give a structurally stable product during the useful life period but which will undergo embrittlement within a relatively short time after exposure to the elements.

The ethylene polymer compositions can be compounded according to any one of several known techniques, such as, direct addition of all constituents, master batching wherein any single master batch may contain several constituents but will not contain both the polyvalent transition metal compound and the auto-oxidative susceptible organic additive, or any other compounding procedure.

The production of the compositions by direct addition of all constituents and blending until a single homogeneous mixture is obtained are well known techniques. The master batching involves the preparation of two or more compositions which are subsequently combined into a single homogeneous mixture. In the master batching procedure the polyvalent transition metal compound and the auto-oxidative susceptible additive are initially present in separate master batch compositions. These separate master batch compositions are then combined or blended in proper proportions at a future date to produce the ethylene polymer compositions of this invention. This enables one to prolong the shelf or storage life since the degradation reaction does not progress to any appreciable extent until there has been a homogeneous mixing of these two components in the ethylene polymer composition.

For example, one can produce a first master batch of ethylene polymer plus the polyvalent transition metal compound plus sufficient antioxidant to stabilize the first master batch, and a second master batch of auto-oxidative susceptible additive (e.g. propylene polymer, or alkylene oxide polymer) with or without ethylene polymer plus sufficient antioxidant to stabilize the second master batch. In addition, either or both of the master batches can contain the conventional amounts of the additives usually known to be useful in ethylene polymers. Further, one can have more than two so-called master batches, if desired.

During the period in which the first master batch and second master batch are stored in separate containers the environmental degration discussed herein will not occur. Likewise, if one were to blend pellets of the two master batches the blended mixture will not show any signs of environmental degradation. However, as soon as there has been a homogeneous fluxing or melting of the two or more master batches such that the auto-oxidative susceptible additive and the polyvalent transition metal compound are present together in a single, uniform, homogeneous ethylene polymer composition then environmental degradation will commence. This ultimate blending of the multiple master batches can be carried by any of the known procedures such as solution blending, melt blending, milling, Banburying, screw driven mixers, and the like. It can also be carried out in the processing equipment used to produce the ultimate manufactured product, for example during the film extrusion or spinning process.

It was surprising to note that in certain instances ethylene polymer compositions having the same chemical contents produced by the master batch procedure had longer storage stability properties than those produced by the direct addition procedure.

The ethylene polymer compositions of this invention can be produced by any suitable method normally employed in ethylene polymer processing, for example, extruding, such as blown tubular film extrusion, slot-cast die sheet extrusion, slot-cast die extrusion coating; molding such as injection, blow, rotary, transfer and the like; fiber-forming, such as melt spinning, drawing and the like; and so forth.

BASE RESIN

The base resin is a normally solid thermoplastic ethylene polymer. The resin may be an ethylene homopolymer or copolymer wherein the ethylene fraction is predominant or mixtures thereof or with other polymers. Both high and low density polyethylenes and mixtures thereof can be used.

The high density ethylene polymers useful as the base resins in the present invention are essentially linear in structure, and are known as "linear polyethylenes." It is known that high density linear polyethylenes can contain chain transfer agents, and/or chain terminating agents which are used to modify the melt viscosity, molecular weight or other properties of the resins and it is intended to encompass such modified polymers within the scope of this invention. The high density polyethylenes are generally characterized by a density that is about equal to or greater than 0.94 g/cc. and is usually in the range of from 0.94 to about 0.97 g/cc. The high density polyethylenes can have a melt index of from 0.005 to 100 and preferably from 0.15 to 50 decigrams per minute. (ASTM D-1238). It should be noted, however, that mixtures of high density polyethylenes can be used as the base resin in producing the ethylene polymer compositions, and such mixtures can have a melt index less than 0.005 or greater than 100 decigrams per minute.

The low density ethylene homopolymers have densities of less than 0.94 g/cc. and are usually in the range from 0.91 to 0.93 g/cc. The low density ethylene homopolymers have melt indices from about 0.05 to about 100 decigrams per minute inclusive, and preferably from 0.5 to 20 decigrams per minute; mixtures thereof can be used if desired.

The ethylene copolymers useful as base resins are those obtained by the copolymerization of ethylene with any monomer containing the

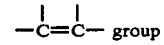

group which will copolymerize with the ethylene and form thermoplastic copolymers. Illustrative of such copolymerizable monomers are the alpha olefins (in minor amounts) containing up to 18 carbon atoms such as propylene, 1-butene; isobutene, and 1-pentene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene, m-methylstyrene, p-phenylstyrene, o-phenylstyrene, m-phenylstyrene, vinyl naphthalene, and the like; vinyl and vinylidene halides, such as vinyl chloride, vinyl fluoride, vinylidene chloride, vinylidene fluoride, vinylidene bromide, and the like; vinyl esters such as vinyl formate, vinyl acetate, vinyl propionate, vinyl butyrate, vinyl chloroacetate, vinyl chloropropionate, vinyl benzoate, vinyl chlorobenzoate, and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl esters and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and butadiene, isoprene, cyclopentadiene, hexadiene-1,6, norbornadiene, dicyclopentadiene, and the like; also vinyl pyridine, N-vinyl carbazole, N-vinyl pyrollidine, acrolein, vinyl alcohol, vinyl acetal, vinyl butyral, and the like. Other monomers which may be interpolymerized with ethylene include, carbon monoxide and formaldehyde, but these are generally not preferred.

These copolymer resins should contain a major amount of ethylene units polymerized in the copolymer. Preferably the copolymer should contain from about 50 to about 99 weight percent polymerized ethylene monomer and most preferably from about 80 to about 99 weight percent polymerized ethylene monomer, depending upon the particular copolymerizable monomer employed and the intended end use of the ethylene polymer composition of this invention.

Other suitable polymers include by way of example ethylene/ethylidenenorbornene/propene-1 terpolymers and ethylene/hexadiene/propene-1 terpolymers terpolymers, the ethylene component is dominant and is present in amounts from about 50 to about 99 percent. The propene-1 component is present in concentrations of from about 1 to about 50 percent by weight of the terpolymer; the residual weight percent is of course the third component.

Preferred base resins are the ethylene homopolymers while the preferred copolymer base resins are ethylene-vinyl acetate; ethylene-ethyl acrylate and the partially hydrolyzed ionic salt forms thereof; ethyleneacrylic acid and the ionic salt forms thereof, ethylenepropylene; and ethylene-styrene. The preferred terpolymer is ethylene/propylene/ethylidene-norbornene.

The base resin constitutes the major component of the ethylene polymer composition and is normally present at a concentration of from about 70 to about 99 percent by weight; the remainder of the composition being the other additives thereof. Preferably the base resin is present at a concentration of from about 90 to about 99 weight percent of the ethylene polymer composition.

The selected weight percentages of each individual additive is of course dependent on several parameters, including but not necessarily limited to the desired rate of degradation, molecular weight of the additive, relative activity of the additive, desired physical properties of the ethylene polymer composition of this invention being prepared and so forth.

AUTO-OXIDATIVE SUSCEPTIBLE ADDITIVE

The auto-oxidative susceptible additive can be either a polymer wherein the predominance of the repeating units have, or a low molecular weight organic compound that has, at least one hydrogen bonded to a carbon atom having an auto-oxidative susceptibility greater than that of a hydrogen bonded to a normal secondary carbon atom. For example the polymer used as the auto-oxidative susceptible agent has an auto-oxidative susceptibility that is greater than that of unbranched polyethylene.

Thus, polypropylene, which has hydrogen atoms bonded to tertiary carbon atoms that are more readily oxidizable than the hydrogen atoms that are bonded to the normal secondary carbon atoms of polyethylene is a suitable auto-oxidative susceptible additive in polymer form. Illustrative of other readily auto-oxidative hydrogen atoms bonded to carbon atoms are the hydrogen atoms found, for example, in the allylic, benzylic, tertiary aliphatic, aldehydo, alpha-oxyhydrocarbyl or alpha-halohydrocarbyl groups.

Among the auto-oxidative susceptible polymers one can include the alpha-olefin polymers which are normally solid at room temperature and contain the unit:

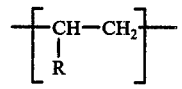

wherein R is an alkyl group containing from about 1 to 18 carbon atoms. Illustrative of such alpha-olefin polymers are polypropylene, poly(butene-1), poly(pentene-1), poly(4-methylpentene-1), poly(hexene-1), poly(octene-1), poly(octadecene-1), and the like. It is considered preferable in this invention that the repeating unit of the auto-oxidative susceptible alpha-olefin polymers employed possess ratios of tertiary carbon atoms to secondary carbon atoms in the range of 1:1 to 1:16 and most preferably 1:1 to 1:6. Other suitable auto-oxidative susceptible additives include the polyalkylene oxides such as polyethylene oxide, polypropylene oxide, including the block and random copolymers thereof, and the like; polyunsaturated hydrocarbons such as polyterpenes and the like.

The preferred auto-oxidative susceptible additive is polypropylene, atactic or isotactic, crystalline or amorphous. Polypropylene when employed in the ethylene polymer composition yields a product having the desired physical properties for consumer-type applications and furthermore more rapidly promotes high levels of crazing to form small particulates. Also included as suitable polymers are block polymers containing a predominant amount of propylene blocks.

Among the suitable readily auto-oxidative susceptible low molecular weight organic compounds are those having a molecular weight less than about 5,000, for example, derivatives of aliphatic and cycloaliphatic compounds containing one or more allylic hydrogens such as myrcene, ocimene, limononene (dipentene), cyclohexadiene, dicyclopentadiene, decahydronaphthalene, indene, tetrahydroindene, ethylidenenorbornene, and the like; the unsaturated fatty acids such as eleostearic acid, linolenic acid, linoleic acid, oleic acid, crotonic and sorbic acid as well as adducts of these and other unsaturated aliphatic and alicyclic compounds with such as maleic acid, acrylic acid, acrolein, and the like; compounds with highly reactive benzylic hydrogens such as cumene, para-isopropylbenzoic acid, and the like.

Preferably the readily auto-oxidative susceptible polymers and low molecular weight compounds are hydrocarbons but they need not be. The presence of functional groups is not precluded but neither is it generally considered desirable.

The auto-oxidative susceptible additives are normally present at concentrations of from about 0.01 to about 40 weight percent of the ethylene polymer composition. Preferably the auto-oxidative susceptible additive is present in amounts of from 0.05 to about 20 percent and most preferably in amounts of from 0.1 to about 10 percent by weight based on the total weight of the ethylene polymer composition. Greater or lesser quantities of auto-oxidative additive may be employed depending upon the rate of degradation and the physical properties desired in the ethylene polymer composition.

POLYVALENT TRANSITION METAL SALT

This additive may be any metal salt, organic or inorganic, wherein at least one metal is a polyvalent transition metal, and preferably is an organic salt of a polyvalent transition metal and most preferably is an organic salt of a polyvalent transition metal wherein the metal is one wherein electron transfer occurs in the 3d sub-shell or the 4f sub-shell. The transition metals referred to are as defined in the Periodic Chart at the terminal leaf page of the Handbook of Chemistry and Physics. The Chemical Rubber Co., 49th edition, (1968–69). They are those elements in the Fourth Period having atomic numbers of 21 to 30, in the Fifth Period having atomic numbers of 39 to 48, and in the Sixth Period having atomic numbers of 57 to 71. Among the specific-transition metals wherein electron transfer occurs in the 3d sub-shell one can mention V, Cr, Mn, Fe, Co, Ni, Cu, Zn, Zr and Ag of the Fourth and Fifth Periods, among the transition metals wherein electron transfer occurs in the 4f sub-shell are Ce or Pr in the Sixth Period.

Suitable polyvalent transition metal inorganic salts pursuant to this invention are by way of example, iron chloride, zinc chloride, mercurous chloride, chromium trichloride, copper nitrate, copper sulfate, cobalt chloride, nickel sulfate, iron sulfate, iron bromide, zinc sulfate, mercuric sulfate, and the like.

Typically the organic salt is the octoate, naphthenate, acetate, stearate or acetylacetonoate metal salt, but it need not be so limited and other organic groups may be employed if desired.

Illustrative of suitable organic salts of polyvalent transition metals one can mention merely by way of examples, cobalt acetate, cobalt octoate, cobalt naphthenate, iron napthenate, iron octoate, lead stearate, lead octoate, zirconium stearate, cerium octoate, manganous stearate, manganous oleate, manganous dodecyl acetoacetate, cobalt acetyl acetonate, cobaltous acetate, cobaltous oleate, cobaltous stearate, cobaltous dodecyl acetoacetate, cupric stearate, cupric oleate, ferric acetate, zinc octoate, zinc naphthenate, iron distearate, potassium permanganate, potassium trioxalatocobaltate (III), trisethylenediaminecobalt (III) chloride, sodium hexanitrocobaltate (III), potassium hexacyanocobaltate (III) and the like.

Polyvalent transition metal salts pursuant to the practice of this invention may be used individually or in combination. It has been found that certain combinations of polyvalent transition metal salts promote degradation more so than the equivalent amount of any one salt of the combination; this is particularly noticeable with mixtures of iron and cobalt salts.

The polyvalent transition metal salts are normally present in amounts of from about 0.002 to about 2.0 weight percent of metal atom, based on the weight of the total composition. Preferably the metal is present in amounts of from about 0.005 to about 1.0 and most preferably in amounts of from about 0.01 to about 0.1 weight percent, based on the weight of the total composition. The need for only such small amounts of the polyvalent transition metal salt to give suitable weathering characteristics is an attractive feature of this invention insofar as the small amounts of salt generally do not adversely effect the mechanical properties of the base resin.

ANTIOXIDANT

Any of the antioxidants used with ethylene polymers can be used in the compositions of this invention. These include the sterically hindered phenols, the aryl amines, the thioureas, thiocarbamates, thioether esters, phosphites or mixtures or adducts thereof.

By the term sterically hindered phenol is meant a substituted or unsubstituted compound containing at least one sterically hindered group of the structure

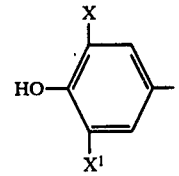

Wherein X is hydrogen, alkyl of from 1 to about 10 carbon atoms or a substituted or unsubstituted phenyl and $X^1$ is alkyl of from 1 to about 10 carbon atoms or a substituted or unsbustituted phenyl, said sterically hindered group being susceptible to proton donation. Generally the sterically hindered phenol will be one that does not volatilize or decompose appreciably below temperatures of about 200° C.

Illustrative of suitable phenol antioxidants one can mention tetrakis[methylene-3-(3',5'-di-tert-butyl-4'-hydroxyphenyl propionate]methane (IRGANOX 1010), stearyl 3-(3',5'-di-tert-butyl-4'-hydroxyphenyl)-propionate (IRGANOX 1076), distearyl 3,5-di-tert-butyl-4-hydroxybenzyl phosphite (IRGANOX 1093), 1,1,3-tris(5'-tert-butyl-4'-hydroxy-2'-methyl-phenyl)butane (TOPANOL CA), 4-methyl-1,6-di(2'-hydroxy-3'-tert-butyl-5'-methylbenzyl)phenol (PLASTONOX 80), 2,4-di(3',5'-di-tert-butyl-4'-hydroxyphenoxy)triazine (IRGANOX 858), 2,2'-thiobis(4'-methyl-6'-tert-butyl-phenol)(COA-6), 4,4'-thiobis(3-methyl-6-tert-butyl-phenol)(SANTONOX R), 3,5-di-tert-butyl-4-hydroxyanisole (TOPANOL 354), 2,6-di-tert-butyl-p-cresol (IONOL).

Among the suitable amine antioxidants one can mention N-phenyl-beta-naphthylamine, N,N'-diphenyl-p-phenylenediamine, p-isopropoxy diphenylamine, N,N'-di-beta-naphthyl-p-phenylenediamine, N,N'-di-(2-octyl)-p-phenylenediamine, N,N'-di-3(5-methylheptyl)-p-phenylenediamine, aldol-alpha-naphthylamine, 4,4'-dioctyldiphenylamine, 4-octyldiphenylamine, 4-t-butoxydiphenylamine, the polymer of 1,2-dihydro-2,2,4-trimethylquinoline, and the like.

Among the suitable thioureas are the polyalkyl thioureas having up to about 4 carbon atoms in the alkyl groups such as trimethyl thirouea, 1,3-diethyl thiourea or ethylene thiourea, and the like. Thiocarbamates include the alkali metals salts thereof such as sodium dibutyl dithiocarbamate, and the like. The thioether esters include dilauryl thiodipropionate, distearyl thiodipropionate, and the like. Among the known phosphites one can mention the mono-, di- and tri-nonylphenyl phosphites, distearyl pentaerythritol diphosphite (WESTON 618), the adduct of trinonylphenyl phosphite with 1,1,3-tris(5-tert-butyl-4-hydroxy-2-methyl-phenyl)-butane (ARGUS MARK 1409), and the like.

Other suitable antioxidants include dibutyl-para-cresol, p-cresol-formaldehyde resins, para-tertiary-alkylphenol formaldehyde resins in admixture with amino dithioformates, aliphatic polyepoxides, organic phosphites, thiophosphates, or dithiophosphites, paratertiary alkylphenol formaldehyde resins in admixture with mercapto compounds, 2-thiono-2-mercaptodioxaphosphorinane compounds, tetraphenylsuccinodinitriles or triphenylmethane, or dithiophosphate metal salts, and the like, as well as combinations thereof; also, chelating agents, such as for example, carboxylic acids, such as malonic acid, succinic acid and the like; substituted oxamides such as oxanalide and the like; amino acids such as glycine, and the like; amino polycarboxylic acid, such as ethylenediamine tetraacetic acid, diethylenetriamine pentaacetic acid, hydroxyethyl ethylenediamine triacetic acid, nitrilotriacetic acid, hydroxyethylimino diacetic acid, diaminocyclohexane tetraacetic acid, diaminoethyl ether tetraacetic acid, ethylenediamine di(o-hydroxyphenyl acetic acid); N-phenyl-N'-(p-toluene sulfonyl)-p-phenylenediamine, N,N-disalicylidene propylenediamine, and the like; pentaerythritol, sorbitol, resorcinol, and other polyfunctional alcohols and esters thereof; as well as combinations thereof.

The antioxidant is normally present in quantities sufficient to stabilize the composition against oxidative degradation for the entire useful life period desired and is generally from about 0.0025 to about 1 weight percent perferably from about 0.025 to 0.1 weight percent, based on the weight of total ethylene polymer composition.

It is of interest to note that almost all ethylene polymers often contain minute amounts of antioxidant, but this amount is normally not sufficient to stabilize the ethylene polymer composition of this invention and additional amounts are often required.

However, in certain embodiments of this invention the antioxidant need not be present or need be present in only minute amounts. In these two cases the ethylene polymer composition will of course degrade very rapidly upon exposure to the elements. This aspect of rapid degradation is important in an application where a product prior to use is sealed in a covering which eliminates action by the elements, particularly sunlight, rain and oxygen. When sought to be used the particular product is removed from the covering, used as required within a pre-specified time, and discarded to the environment for rapid degradation. For such embodiments of this invention it has been found that concentrations as low as 0.0025 percent by weight of antioxidant can be used.

As other aspects of this invention it is recognized that certain suitable antioxidants as aforesaid offer additional benefits which give further dimension to this invention. For example certain antioxidants, such as thioureas, are water soluble. Products produced from the ethylene polymer compositions of this invention containing thioureas may be utilized for long periods in a relatively dry environment; then after exposure to aqueous environmental elements such as rain or fog leaching of the thioureas occurs rendering the product more actively degradable. Another example is wherein the antioxidant is biodegradable, such as certain thioether esters, as for example dilauryl thiodipropionate and the like. In these cases bacteria found in the environment consume the antioxidant in the product, rendering the product more actively degradable. Still another example is wherein the antioxidant is volatile, such as mercaptomalic acid, and certain urea derivatives such as 1,1-diethyl urea. Because of its volatility such an anitoxidant would generally be applied to the plastic object after fabrication by immersion in a solution of the antioxidant or by the use of a roller coater or spray gun or other suitable application technique. Such volatile antioxidants may also be used in conjunction with less volatile antioxidants present in minor concentrations in the ethylene polymer compositions. The volatile antioxidants upon discard to the environmental elements volatilize rendering the plastic product more actively degradable. A further example is wherein the antioxidant is heat stable but light unstable such as alpha-phenylindole and diphenyl thiourea. A plastic product employing antioxidants of this nature may be stored in a dark environment and when exposed to sunlight will readily start to degrade.

In another aspect of this invention it has been found that a preliminary irradiation of the ethylene polymer composition will greatly enhance the rate of degradation as compared to non-irradiated ethylene polymer composition. As previously pointed out an antioxidant may additionally be included to maintain a more stable composition prior to irradiation.

Normally the requisite level of ionizing radiation to accelerate degradation is from about 1 to about 20 megareps (MGRPS). Greater or lesser dosages of radiation may be employed depending upon the particular desired rate of degradation. Such sources include the van de Graaff accelerator, cobalt 60, and the like. Other suitable modes of irradiation are, by way of example, ultraviolet lamp, sunlamp, swirl-flow plasma arc, mercury lamp, and the like. Any known radiation source can be used.

This irradiation aspect of this invention is important in large volume plastic waste disposal units wherein the waste plastic is irradiated prior to exposure to the elements to provide an accelerated rate of degradation.

In the following examples the processing and analytical methods used for sample preparation are as described immediately hereinbelow. Two compounding methods were employed. The first and primary method of sample compounding is by employing the two roll mill (hereinafter called "roll mill method"). The second method employed a Banbury mixer (hereinafter called "mixer method").

A 6 inches × 12 inches two-roll mill with heat supplied by full stream at 190° C. and heated for at least 15 minutes is used. With the bite as close as possible the ethylene base polymer is added and then during a period of about 1 minute the bite is opened after the ethylene polymer has begun to flux. The polypropylene or other auto-oxidative susceptible agent is added. Thereafter antioxidant and other filler (if applicable) are added. The polyvalent transition metal salt is then slowly added in about 30 seconds. The material is worked for 2 minutes until homogeneous, then pulled off the rolls and cut into squares about 2 inches by 2 inches. It is recognized that any of the other conventional additives usually present, such as pigment, slip agents, anti-block agents; etc. can be present if desired. Unless otherwise stated this method was used in the examples.

In the mixer method a 5 lb. Banbury mixer was employed with full steam on the shell and rotors for 5 minutes to achieve 190° C. The ethylene base polymer and auto-oxidative susceptible agent, such as polypropylene, were added. The ram was moved downward at the full pressure of 80 psi and the Banbury operated at maximum forward speed for 3 minutes or until the materials are fluxed. The antioxidant, filler (if applicable), and polyvalent transition metal salt were added with the ram backed down to 10 psi and the Banbury at its slowest forward speed for one minute. The ram pressure was then readjusted to 80 psi and the Banbury was then operated at full forward speed for 2 minutes. Cooling water was then supplied to the shell and rotors and the mixer was operated at its slowest forward speed for one minute. Thereafter the compounded material was discharged, sheeted and diced.

After compounding by either the mixer or roll mill method the samples were compression molded by the following method. A mold lined with Mylar sheet was charged with the ethylene polymer composition. It was placed between preheated (190° C.) plattens and low pressure (1 ton on 6 in.² ram) was applied for four minutes followed by full pressure (32 tons on 6 in.² ram) for two minutes. The plattens were then water cooled and the sample was recovered.

Weathering tests were conducted by placing a plurality of identical specimens from the same molded sheet in an Atlas XW Weatherometer that uses a carbon arc radiation source with Corex D filters to simulate solar light spectral distribution. The sample was maintained at a blackbody radiation temperature of 140° F. over a four hour period, which included an 18 minute period of water spray. Water was permitted to accumulate at the bottom of the chamber to provide a humidified condition. The exposed samples are removed from the Weatherometer after certain periods of time and examined for embrittlement, % elongation and FMIR. The period in hours that has transpired is recorded when the sample fails the test. Normally the samples are rated at the end of 20, 60, 100, 150, 200, 250, 350, 500, 750 and 1,000 hours of exposure. The specimen from the previous rating period is removed permanently from the Weatherometer at the end of the 60, 150, 250, 500 and 1,000 hours periods for complete evaluation. By this is meant that at the 20 hour period the first specimen is removed, rated and returned, at the 60 hour period it is permanently removed, rated and tested; at the 100 hour period the second specimen is removed, rated and returned, at the 150 hour period it is permanently removed, rated and tested. This procedure is continued in the time pairs until all of the specimens have been consumed and permanently removed. On occasion additional specimens were permanently removed, rated and tested at the 20 or 100 hour periods.

The permanently removed weathered samples were examined by surface reflectance infrared spectroscopy, known in the art as frustrated multiple internal reflection (FMIR), to examine buildup of the surface carbonyl layer due to weathering exposure. A Wilks Model-9D FMIR attachment on a Perkin-Elmer Model 21 infrared spectrophotometer was used to make the ratio measurements, hereinafter referred to also as R. A measure of the surface carbonyl buildup relative to methylene is calculated by the equation $R = A5.8/A7.3$; i.e. the absorbance of the carbonyl peak at 5.8 microns to the absorbance of the methylene peak at 7.3 microns. This is usually performed on a specimen that has not been exposed and on specimens after 60 and 150 hours exposure; on occasion specimens were analyzed after exposures of 20 hours, 40 hours, 80 hours or 100 hours. The ratio R rarely exceeds 1.0 for weathered conventional polyethylene (which is still flexible). Embrittled polyethylene will have R values exceeding 1.0. An R value of 1.7 may be correlated with the onset of embrittlement. R values of 1.9 to 2.2 are characteristic of a fully developed surface carbonyl layer. R values above 2.5 are due principaaly to diminishing of the methylene peak, rather than to an increase in surface carbonyl level. The impact of a fully developed surface carbonyl layer is recognized to be that (1) oxidation of the bulk of the resin is proceeding and (2) fracture prone sites exist on the specimen surface. Cracks initiated in the oxidized surface layer propogate through the less oxidized material in the interior of the polymer resulting in deterioration thereof.

The tensile physical properties of the weathered samples, tensile modulus, tensile strength, and ultimate elongation were measured by a modified ASTM D882-67(Method A) procedure using an Instron Tensile Tester after 0, 60, 150, 250 and 500 hours exposure, and occasionally after 20 hours or 100 hours of exposure. In this modification a one inch specimen is used and stretched at a rate of 0.2 inch per minute to a one per cent stretch to obtain the modulus; the same specimen is then stretched at a rate of 2 inches per minute to obtain the stress-strain curve. Elongation deterioration correlates with the embrittlement observed in the aforesaid Atlas XW Weatherometer ratings. Normally an ultimate elongation value less than 50% is slightly brittle and a value below 20% is brittle.

It was observed that as weathering exposure proceeds, surface cracking appeared. The cracks occur in polyethylene compositions generally after the onset of embrittlement, usually between 150 to 250 hours of exposure. Through the optical microscope, the crack patterns which appeared on the surface of severely oxidized samples were clearly visible. The cross section fracture surfaces of brittle specimens were observed through the optical microscope and at magnifications of 46 × to 300 × it was possible to determine which areas of the cross section were brittle. Scanning electron micrographs of the weathered specimen at a magnification of 500 × show that the cracks were formed by brittle failure resulting in very sharp clean cuts. Primary cracks are normal to the surface and are beleived to be influenced by the internal stress disbtibution in the specimen, and will be parallel to the surface if the stress distribution in the specimen is uniform. Secondary cracks join the primary cracks, are ess-shaped, and slant inward at an angle less than 90° to the surface. Tertiary cracks join primary and secondary ones and also are ess-shaped and likewise slant inwardly. This produces a network of cracks in which the spacing between the cracks progressively becomes smaller and results in particles on the order of 350 microns in width which can readily peel off or slough off due to the "slant faults" similar to that mechanism observed in exfoliating rocks.

The stability of the samples prior to weathering was determined by Differential Scanning Calorimetry (DSC). A du Pont 900 Thermal Analyzer with DSC module attachment and an external strip chart recorder were used for the isothermal DSC induction time studies. By measuring the length of time at 180° C. or 200° C. required for the heat of oxidation to be evolved, the stability of the compound can be determined. At 200° C. well-stabilized commercial polyethylene has a 3 to 6 minute induction time. All induction times are given in minutes unless otherwise specified.

The DSC induction time measurements were made as follows: Test batches of ethylene polymer compositions were prepared on a two roll mill on which were blended 100 gram batches of ethylene polymer and additives. Minimum fluxing temperatures were used to avoid premature oxidation effects. The fluxed mixtures were then pressed into plaques about 10 × 10 inches with a thickness of 10 mils on a heated hydraulic press. Circular specimens 0.20 inches in diameter were cut from the 10 mils plaques and then placed in aluminum sample holders of the Differential Scanning Calorimeter (DSC) cell. In each case the sample holder plus sample were then placed on the raised sample position while an empty aluminum sample holder was placed on the raised reference position. Nitrogen was passed through the assembled DSC cell at a gas flow rate of 500 ml./min. blanketing the sample and reference cells with an inert atmosphere. The sample and reference cells were then heated at a programmed rate of 80° C. per minute to a preselected isothermal temperature. When equilibrium temperature was obtained, an accurate millivolt recorder (with a 1 inch per minute linear chart speed and a 0 to 25 millivolts chart span) began to record the amplified differential thermocouple signal from the DSC cell. After one inch of chart travel the nitrogen flow was rapidly stopped and air was passed through the DSC cell, also at a flow rate of 500 ml per minute. The sharp inflection in the exothermic direction of the recorded curve indicated the end of the induction period. Since the induction time is that period of time during which there is no exotherm or thermal oxidative degradation, it is a measure of the effectiveness of thermal stabilizing additives which have been compounded with the ethylene polymers. A direct comparison between controls and the compositions of this invention is therefore provided by this induction time measurement.

referred to as "FMIR R>1.7" and the ultimate elongation to fall below 20%, hereinafter also referred to as "≦ 20% ELONG." The effect of the added polypropylene in Control C in promoting embrittlement is to reduce the exposure time required for embrittlement to occur as compared to Control B without polypropylene. The effect of the cobalt metal salt in Control A is to reduce the exposure time required for embrittlement over that necessary in Controls B or C without cobalt. The effect of the combined system of this invention is to produce an interaction which promotes embrittlement at a much faster rate than is observed for any of the controls. This embrittlement effect is also polypropylene concentration dependent; that is the exposure time required for embrittlement to occur decreases as the polypropylene concentration increases and in all instances embrittlement of the ethylene polymer compositions of this invention proceeded faster than in Controls A, B or C.

Ethylene polymer compositions identical in every way with the above, but irradiated with a 5 megarep dose prior to weathering, demonstrated reduced exposure times for embrittlement to occur as the polypropylene concentration increased and required less exposure time to embrittle than the equivalent unirradiated samples of Part A of Table I at polypropylene concentrations of 2% and higher. The exposure times for the irradiated compositions are listed in Table I, Part B.

TABLE I

| Ethylene Polyer Composition, % by weight | | | Exposure Times Required, Hours | | | | | |
|---|---|---|---|---|---|---|---|---|
| | | | PART A | | | PART B | | |
| LDPE | PP | Co | Embr. | FMIR R>1.7 | ≦20% ELONG. | Embr. | FMIR R>1.7 | ≦20% ELONG. |
| 70 | 30 | 0.10 | 60 | 60–150 | 20 | 20 | 60–150 | 0–20 |
| 80 | 20 | 0.10 | 20–60 | 60–150 | 20 | 20 | 60–150 | 0–20 |
| 90 | 10 | 0.10 | 60 | 60 | 60 | 20 | 20 | 0–20 |
| 95 | 5 | 0.10 | 100 | 60 | 100 | 60–100 | 20–60 | 60 |
| 98 | 2 | 0.10 | 150 | 60 | 150 | 100–150 | 20–60 | 100 |
| 99.6 | 0.3 | 0.10 | 150–250 | 60 | 150 | 150–250 | 20–60 | 100 |
| 99.8 | 0.1 | 0.10 | 150 | 60–150 | 150 | 60–250 | 60–100 | 60 |
| 100* | 0 | 0.10 | 250 | 60 | 150 | 250 | 20–60 | 150 |
| 100** | 0 | 0 | >1000 | >150 | >500 | 1000 | 150 | 500 |
| 90*** | 10 | 0 | 750 | 750 | 500 | 500 | 500 | 500 |

*Control A
**Control B, contains an amount of mineral spirits equal to that present in all other samples.
***Control C

EXAMPLE I

Ethylene polymer compositions containing low density polyethylene LDPE (0.922 density), polypropylene PP (98% isotactic) as a polymeric auto-oxidative susceptible additive in amounts of 0% (Control A), 0.1%, 0.3%, 2%, 5%, 10%, 20% and 30%, and 0.10% of cobalt metal (Co) as a cobalt naphthenate solution in mineral spirits were prepared in the aforedescribed manner. A control (Control B) sample consisting of the base resin and the same amount of mineral spirits as was added above as solution, and a second control (Control C) sample consisting of the base resin and 10% polypropylene were also prepared. The aforesaid samples were fabricated into 20 mil plaques and weathered according to the aforementioned procedure.

The exposure time required for embrittlement, hereinafter also referred to as "Embr.", to occur is listed in Table I, Parts A and B, as well as the time required for the surface carbonyl level to exceed 1.7, hereinafter also

EXAMPLE II

Example I was repeated using cobalt octoate, in place of the cobalt naphthenate, at several varying concentrations. In all instances the ethylene polymer compositions contained two weight percent polypropylene. The results are reported in Table II, Parts A and B.

TABLE III

| Ethylene Polymer Composition, % | | Exposure Times Required, Hours PART A | | |
|---|---|---|---|---|
| LDPE | Co | Embr. | FMIR R>1.7 | ≦20% ELONG. |
| 96 | 2 | 200–250 | 150 | 250 |
| 97 | 1 | 200 | 150 | 150–250 |
| 98 | 0.10 | 100–150 | 100–150 | 150 |
| 98 | 0.075 | 100–150 | 100–150 | 150 |
| 98 | 0.050 | 150 | 100–150 | 150 |
| 98 | 0.025 | 100–150 | 150 | 150 |
| 98 | 0.010 | 150 | 150–200 | 150–250 |
| PART B | | | | |
| LDPE | Co | Embr. | FMIR R>1.7 | ≦20% ELONG. |
| 96 | 2 | 200–250 | 150 | 150–250 |
| 97 | 1 | 150–200 | 150 | 150–250 |
| 98 | 0.10 | 100–150 | 60 | 150 |
| 98 | 0.075 | 100–150 | 60 | 150 |
| 98 | 0.050 | 60–100 | 60 | 150 |

TABLE III-continued

| 98 | 0.025 | 100–150 | 150 | 150 |
|----|-------|---------|-----|-----|
| 98 | 0.010 | 100 | 60 | 60–150 |

EXAMPLE III

This example demonstrates the use of polypropylenes of various degrees of tacticity and molecular weight.

Ethylene polymer compositions containing 98% of a 0.922 density DLPE, 2% polypropylene and 0.05% cobalt metal as a cobalt naphthenate solution in mineral spirits were prepared using a 98% isotactic polypropylene, an atactic polypropylene, and an isotactic polypropylene wax (relatively low molecular weight) that had been prepared from the isotactic polymer by pyrolysis. These compositions were fabricated into 20 mils plaques and weathered according to the aforementioned procedure.

All of the above compositions, which were weathered in a similar manner, produced embrittlement by 150 hours, a surface carbonyl level greater than 1.7 by 150 hours, and an ultimate elongations below 20% by 150 hours exposure.

EXAMPLE IV

This example demonstrates the use of LDPE of several densities.

Ethylene polymer compositions containing 98% of LDPE, 2% polypropylene (98% isotactic) as the autooxidative susceptible polymer additive and 0.025% to 0.075% cobalt metal, as either the cobalt octate or cobalt naphthenate solution in mineral spirits, were prepared using LDPE having densities of 0.919, 0.922, 0.924, 0.925 and 0.928 as the base resins. These compositions were fabricated into 20 mils plaques or 2 mils films and weathered according to the aforementioned procedure.

All of the above compositions showed accelerated embrittlement and had become brittle by 100 to 200 hours of exposure.

EXAMPLE V

Ethylene polymer compositions containing 98% of LDPE, 2% polypropylene (98% isotactic) as the autooxidative susceptible polymer additive, and 0.025% cobalt metal as cobalt naphthenate solution in mineral spirits were prepared from a 0.924 density LDPE of the type formed by polymerization in a tubular reactor and a 0.925 density LDPE of the type formed by polymerization in a stirred autoclave as the base resins. These compositions were fabricated into 20 mils plaques and weathered according to the aforementioned procedure.

The weathering behavior of these two samples was similar. Both embrittled by 150 hours of exposure, achieved surface carbonyl levels above 1.7 by 150 hours of exposure, and achieved ultimate elongation deterioration below 10% by 150 hours of exposure.

EXAMPLE VI

Ethylene polymer compositions containing a 0.922 density LDPE as the base resin, polypropylene (98% isotactic) in amounts of 0%, 2%, 5% and 10% and 0.10% cobalt metal as cobalt naphthenate solution in mineral spirits were prepared. A control sample consisting of the base resin alone was also prepared. All of the above compositions contained the usual slip (oleamide), antiblock (silica), and antioxidant (2,6-ditert-butyl-4-methylphenol), system in the conventional amounts used in commercial LDPE. These compositions were extruded through a 1 inch NRM extruder at 400° F and reextruded through the extruder until the composition had been reextruded five times. After each pass a 20 mils plaque was fabricated, tested for physical properties, and weathered according to the aforementioned procedures.

The ultimate elongation data of each composition, including the control, showed that no premature deterioration of elongation had occurred by virture of the reextrusions. The initial ultimate elongation values of all compositions prior to weathering was consistent with the behavior of the control sample. All of the plaques specimens containing both polypropylene and cobalt salt exhibited accelerated embrittlement within 60 to 250 hours upon weathering. The control specimen remained flexible after 500 hours of exposure.

EXAMPLE VII

Ethylene polymer compositions containing of a 0.922 density LDPE as the base resin, 1.16% polypropylene as the auto-oxidative susceptible additive, (98% isotactic) and 0.05% of cobalt metal as the following salts: (1) solid cobalt acetate, (2) cobalt octoate solution in mineral spirits, (3) cobalt naphthenate solution in mineral spirits, and (4) the cobalt salts of a mixture of branched $C_8$ and $C_9$ acids in mineral spirits, known as cobalt Nuxtra. These compositions were fabricated into 20 mils plaques and weathered according to the aforementioned procedures. The exposure times required for embrittlement to occur, surface carbonyl level to exceed 1.7, and ultimate elongation to drop below 20% are listed in Part A of Table III. All of the cobalt salt forms were active and promoted accelerated embrittlement in 200 hours exposure or less. The salts dispersed in mineral spirits show enhanced activity, with the naphthenate being the most active form in the 1.16% polypropylene compositions.

Ethylene polymer compositions identical to the above in every way, but containing a 0.922 g/cc density polyethylene base resin, 6.48% polypropylene as the auto-oxidative susceptible additive and 0.10% cobalt metal from each of the same cobalt salts were prepared. The exposure times required for the above phenomena to occur are listed in Part B of Table III. All of the cobalt salt forms were active and promoted accelerated embrittlement in 200 hours exposure or less. The salts dispersed in mineral spirits show enhanced activity in the 6.48% polypropylene compositions. All of the octoate, naphthenate, or mixed branched $C_8$ and $C_9$ acid salts of cobalt show comparable effectiveness in causing accelerated embrittlement in combination with polypropylene in the preferred range of 1 to 6.5% in low density polyethylene.

TABLE III

| | PART A | | |
|---|---|---|---|
| | Exposure Times Required, Hours | | |
| Co Salt | Embr. | FMIR R>1.7 | ≦20% ELONG. |
| Acetate | 200 | >150 | >150 |
| Octoate | 150–200 | 150 | 100–150 |
| Naphthenate | 150 | 100 | 100 |
| Nuxtra | 150–200 | 100 | 100–150 |
| | PART B | | |
| | Exposure Times Required, Hours | | |
| Co Salt | Embr. | FMIR R>1.7 | ≦20% ELONG. |
| Acetate | 200 | >150 | >150 |
| Octoate | 100 | 150 | 60 |

TABLE III-continued

| | | | |
|---|---|---|---|
| Naphthenate | 100 | 100 | 60–100 |
| Nuxtra | 150 | 150 | 60–100 |

EXAMPLE VIII

Ethylene polymer compositions containing 98% of a 0.922 density LDPE as base resin 2% polypropylene as the auto-oxidative susceptible additive (98% isotactic) and 0.05% metal of the metal salt solution of cobalt octoate, iron octoate, manganese octoate, cerium naphthenate, zinc octoate, lead octoate, zirconium octoate, and calcium octoate in mineral spirits were prepared. These compositions were pressed into plaques and weathered according to the aforementioned procedures.

The exposure times required for embrittlement to occur, surface carbonyl level to exceed 1.7, and ultimate elongation to drop below 20% are listed in Part A of Table IV for the above compositions. In Part B of Table IV are shown the results obtained on identical compositions which had been irradiated with a 5 megarep does prior to weathering.

TABLE IV

PART A

| | Exposure Time Required, Hours | | |
|---|---|---|---|
| Salt | Embr. | FMIR R>1.7 | ≦20% ELONG. |
| Co Octoate | 150 | 60–150 | 60 |
| Fe Octoate | 100 | 60 | 60 |
| Mn Octoate | 150 | 150 | 150 |
| Ce Naphthenate | 150 | | 150–250 |
| Zn Octoate | 250 | | 150 |
| Pb Octoate | 250–500 | | 150+ |
| Zr Octoate | 500 | | |
| Ca Octoate | 500 | | |

PART B

| | Exposure Time Required, Hours | | |
|---|---|---|---|
| Salt | Embr. | FMIR R>1.7 | ≦20% ELONG. |
| Co Octoate | 150 | 60 | 60 |
| Fe Octoate | 150 | 60 | 150 |
| Mn Octoate | 150 | 150 | 150 |
| Ce Naphthenate | 150 | | 150–250 |
| Zn Octoate | 250 | | 150 |
| Pb Octoate | 250–500 | | |
| Zr Octoate | 500 | | |
| Cr Octoate | 500 | | 250+ |

EXAMPLE IX

Ethylene polymer compositions of 0.922 density LDPE as base resin, polypropylene (98% isotactic) as auto-oxidative susceptible additive in amounts of 2% and 5%, and mixtures of 0.05% cobalt metal as cobalt naphthenate solution in mineral spirits and 0.05% iron metal as iron octoate solution in mineral spirits were prepared. Both compositions were pressed into 20 mils plaques and weathered according to the aforementioned procedure. Control samples of the same 0.922 density LDPE were prepared as extruded 20 mils sheets. Compositions identical to the above, but containing 0.10% cobalt metal as cobalt naphthenate solution in mineral spirits, instead of the mixed metal salt system of cobalt naphthenate and iron octoate were also prepared, pressed into 20 mils plaques and weathered by the aforementioned procedure. The exposure times required for embrittlement to occur, surface carbonyl level to exceed 1.7 and ultimate elongation to drop below 20% are listed in Table V. At both polypropylene concentration levels (2% and 5%) the mixed metal salt system promoted accelerated embrittlement in the ethylene polymer compositions. The LDPE control was still flexible after 750 hrs exposure and not embrittled. Compared to similar compositions containing the same polypropylene content and the same total metal content solely as cobalt, the mixed metal salt systems show a decrease in the exposure time required to achieve embrittlemet and for the utlimate elongation to drop below 20%. The results show that the use of a mixture of cobalt and iron is more efficacious than cobalt alone; they also show that cobalt alone is also satisfactory.

TABLE V

| Run | 1 | 2 | 3 | 4 | Control |
|---|---|---|---|---|---|
| LDPE,% | 98 | 98 | 95 | 95 | 100 |
| PP,% | 2 | 2 | 5 | 5 | 0 |
| Co,% | 0.05 | 0.1 | 0.05 | 0.1 | 0 |
| Fe,% | 0.05 | 0 | 0.05 | 0 | 0 |
| Exposure Time Required, Hours | | | | | |
| Embr. | 60–100 | 150 | 100–150 | 100 | >750 |
| FMIR R>1.7 | 60 | 60 | 60 | 60 | — |
| ≦20% ELONG. | 60 | 150 | 60 | 100 | — |

EXAMPLE X

A first ethylene polymer composition containing 95% of a 0.928 density LDPE as base resin 5% polypropylene as auto-oxidative susceptible additive (98% isotactic) and a mixture in mineral spirits of 0.05% cobalt metal as cobalt octoate and 0.05% iron metal as iron octoate and a second ethylene polymer composition containing 98% of a 0.928 density LDPE, 2% polypropylene (98% isotactic) and a mixture in mineral spirits of 0.025% cobalt octoate and 0.025% iron octoate were prepared. Both of these compositions contained 0.05% Irganox-1010 antioxidant, 0.15% erucamide slip agent, and 0.15% silica antiblock agent. The compositions were pressed into 20 mils plaques, extruded into 20 mils sheet, and extruded into 2 mils film, all of which were weathered by the aforementioned procedure. After weathering for 60 hours the surface carbonyl level of both samples fabricated as 20 mils plaques rose sharply. At 100 hours a surface carbonyl level of 2.1 was achieved in both samples. Embrittlement was achieved by 100 hours exposure and the ultimate elongation dropped below 10% after 60 hours of weathering for the first composition and after 100 hrs of weathering for the second composition.

The samples fabricated as extruded sheet were examined after weathering in 20 hours exposure intervals. The surface carbonyl level of both samples rose sharply in the interval between 40 and 60 hours of exposure, rising more rapidly for the first sample. The ultimate elongation dropped below 20% for the first composition after 60 hours exposure and for the second composition after 80 hours exposure. Embrittlement occurred after 80 hours exposure for the first composition and after 100 hours exposure for the second composition, and showed signs of splitting in the first composition after 500 hours exposure.

The samples fabricated as film developed a surface carbonyl level greater than 1.7 more slowly than did the other aforementioned specimens. This surface carbonyl level was obtained in the first composition after 100 hours exposure, and in the second composition after 150 hours of exposure. Embrittlement occurred in the film after 60 hours for the first composition and after 100 hours for the second composition. After 500 hours exposure both film samples had disintegrated and both sheet samples showed signs of failure and splitting along the surface cracks.

EXAMPLE XI

The compositions of Example X, as extruded film and sheet, were tested for lubricity by the coefficient of friction (COF) test, ASTM D 1894. All film and sheet samples had kinetic COF values of 0.16 to 0.03, which is classified as high slip. A control film of the same 0.928 density LDPE without the slip and antiblock additives had a COF value of 0.60, which is classified as very low slip, or no slip.

EXAMPLE XII

Samples of LDPE containing polypropylene in amounts of 0.3, 2.5 and 10% and containing salts in mineral spirits of cobalt, iron, cerium and zinc or combinations thereof in amounts of 0.025, 0.10%, 0.05, 0.075 and without any antioxidant present were found undergo oxidation at room temperature in the absence of sunlight or weatherometer exposure to produce embrittlement after one month duration or longer. Irradiation by sunlight, UV, or very intense visible light accelerates the rate at which embrittlement occurs. Embrittlement in the absence of the irradiation was found to occur whether the sample was fabricated as a plaque, extruded sheet, or extruded film or whether it was in resin form and then later fabricated. Associated with the embrittlement in the absence of irradiation is the appearance of odor recognizably associated with oxidation and believed indicative of the presences of short chain aldehydes and acids.

XIII

An ethylene polymer composition containing 98% of a 0.922 density polyethylene (LDPE) as base resin, 2% polypropylene (98% isotactic) as auto-oxidative susceptible additive and 0.075% cobalt metal as a cobalt octoate solution in mineral spirits was prepared according to the procedure aforedescribed. Another composition as above was prepared additionally including a stabilizer system consisting of 0.05% Topanol CA, and 0.15% dilauryl thiodipropionate. Control specimens (1) containing 2% polypropylene in the aforesaid LDPE and (2) neat LDPE, were also prepared. All of the aforementioned compositions were pressed into 20 mils plaques and weathered by the aforementioned procedures. All of the aforementioned samples were pressed into 10 mil plaques for isothermal DSC induction time analyses at 180° C. according to the procedure as aforedescribed. The stabilized composition had an induction period of 14.1 minute at 180° C. while the unstabilized composition had a 0.25 minute induction time at 180° C. The controls had induction times at 180° C. of 0.40 and 0.16 minute respectively.

The above samples and controls were repeated, but irradiated with 5 megareps prior to testing. The isothermal DSC induction time for the irradiated stabilized sample was 4.4 minutes, the induction time for the irradiated unstabilized sample was 0.15 minute, and the induction times for the irradiated controls were 0.20 and 0.05 minute respectively.

Addition of the stabilizers in the combination of polyethylene, polypropylene, and cobalt salt was observed to provide stabilization against embrittlement in the highly active systems, which normally undergo oxidative embrittlement in either the presence or absence of weathering without the stabilizers. Subsequent irradiation of the samples was observed to reduce the effectiveness of the stabilizers. After irradiation the compositions embrittled either in the presence or absence of weathering by the procedure described.

EXAMPLE XIV

Ethylene polymer compositions of (1) 90% of a 0.922 density LDPE as base resin, 10% of polypropylene (98% isotactic) as auto-oxidative susceptible additive and 0.10% cobalt metal as cobalt naphthenate solution in mineral apirits, and (2) 98% of the LDPE, 2% polypropylene (98% isotactic) and 0.025% cobalt metal as above, were prepared both with a stabilization system containing (a) 0.05% of a primary hindered phenol anti-oxidant AO (i.e. Irganox-1010) having four sterically hindered phenol groups linked to a central carbon by fatty acid ester linkages; (b) 0.05% of dilauryl thiodipropionate (DLTDP) and (c) 0.05% of distearyl pentaerythritol diphosphite (DSPD). Control samples which did not contain the stabilization system were also prepared. The compositions were pressed into 20 mils plaques and weathered by the aforementioned procedures. They were also pressed into 10 mils plaques for isothermal DSC induction time analysis at 180° C.

The exposure times required for embrittlement, surface carbonyl level to exceed 1.7 and ultimate elongation to drop below 20% are listed in Part A of Table VI. The isothermal DSC induction times obtained at 180° C. are also reported in Part A of Table VI. The exposure time for the stabilized samples at which ultimate elongation deteriorates below 20% when compared with the exposure time required for the unstabilized control samples was found to be slightly longer. The presence of stabilizers in the second formulation has a more noticeable effect on these properties (elongation deterioration and surface carbonyl level build-up); but does not retard the embrittlement occurrence significantly. The isothermal DSC induction time data indicates that in the absence of weatherometer exposure these samples are quite stable and have considerably long induction times at 180° C.

Compositions identical in every way with the above two samples, but irridated prior to testing with 5 megareps were also prepared. The exposure times required by the various test procedures and the induction times are reported in Part B of Table VI. Irradiation acts to reduce the exposure time required for the ultimate elongation to drop below 20%. After irradiation the irradiated stabilized samples embrittle in either the presence or absence of weathering.

TABLE VI

| | | | | PART A (Unirradiated) | | | |
|---|---|---|---|---|---|---|---|
| %PP | %Co | %AO | %DSPD | Embr. | FMIR R>1.7 | ≦20%ELONG. | DSC Induction Time. Min. |
| 10 | 0.10 | 0.05 | 0.05 | 150 | 150 | 150 | 24.8 |
| 2 | 0.025 | 0.05 | 0.05 | 150 | 150–250 | 150–250 | 26.7 |
| CONTROLS | | | | | | | |
| 10 | 0.10 | 0 | 0 | 150 | 150 | 60 | 0.10 |

TABLE VI-continued

| 2 | 0.025 | 0 | 0 | 150 | 150 | 150 | 0.14 |
|---|---|---|---|---|---|---|---|
| PART B (5 Megareps irradiation) | | | | | | | |
| 10 | 0.10 | 0.05 | 0.05 | 150 | 150 | 60 | 0.12 |
| 2 | 0.025 | 0.05 | 0.05 | 150 | 150 | 60-100 | 0.13 |

EXAMPLE XV

This example demonstrates the use of mixtures of organic metal salts with and without stabilizers.

An ethylene polymer composition containing 95% as base resin, 5% polypropylene (98% isotactic) as the auto-oxidative susceptible additive and a mixture of 0.05% cobalt as cobalt octoate and 0.05% iron as iron octoate in mineral spirits solution was prepared that also contained a stabilization system consisting of 0.05% of a hindered phenol antioxidant (Irganox-1010), 0.15% of a thioester (dilauryl thiodipropionate) and 0.05% of distearyl pentaerythritoldiphosphite. A sample as above, but excluding the stabilization system, and a control sample containing only the aforesaid 5% polypropylene mixture in 95% LDPE were also prepared. Specimens were pressed as 20 mils plaques and weathered by the aforementioned procedures. Specimens were also pressed into 10 mils plaques for isothermal DSC induction time analysis at 180° C. as aforedescribed.

Both the stabilized and the unstabilized plaques embrittled after 60 hrs exposure in the weatherometer. The control sample of LDPE and polypropylene only embrittled after 500 hours exposure. The stabilized sample had a 19.6 minutes DSC induction time at 180° C., while the unstabilized sample had a 0.76 minute DSC induction time. The control sample had a 0.28 minute DSC induction time.

Specimens as above were irradiated prior to testing. Both the irradiated-stabilized and the irradiated-unstabilized samples embrittled after 60 hours of exposure in the weatherometer and the control embrittled after 250 hours of exposure. The irradiated-stabilized sample had a 1.4 minute DSC induction time at 180° C. The irradiated-unstabilized sample had a 0.11 minute DSC induction time and the irradiated control had a 0.20 minute induction time.

EXAMPLE XVI

This example demonstrates the use of several different antioxidants in ethylene polymer compositions containing 95% of a 0.928 density LDPE as the base resin, 5% polypropylene (98% isotactic) as the auto-oxidative susceptible additive and a mixture of 0.05% cobalt as cobalt octoate and 0.05% iron as iron octoate in mineral spirits. Each composition contained 0.05% of each of the following sterically hindered phenol antioxidants: Irganox 1010, Santonox R, Topanol CA, Irganox 1076, and Ionol. Test specimens were prepared as 10 mils plaques and the isothermal DSC induction time measured at 180° C. The DSC induction times were 9.8, 12.5, 6.2, 6.2 and 3.5 respectively, for the compositions containing the indicated antioxidants.

EXAMPLE XVII

This example demonstrates the effect of secondary stabilizers with primary stabilizers in the presence of a mixture of organic metal salts of the transition metals.

An ethylene polymer composition containing 98% of a 0.928 density polyethylene as the resin, 2% polypropylene (98% isotactic) as the auto-oxidative susceptible additive and a mixture of 0.025% cobalt as cobalt octoate and 0.025% iron as iron octoate in mineral spirits was prepared using 0.05% of the antioxidant Irganox 1010. A second sample as above, but additionally containing 0.05% of distearyl pentaerythritol diphosphite was prepared. A third sample identical with the second sample, but additionally including 0.15% of dilauryl thiodipropionate was prepared. Test specimens were prepared from each as 10 mils plaques and the isothermal DSC induction times at 180° C. measured. The DSC induction times at 180° C. for the first, second and third samples were, respectively, 7.9, 10.0 and 15.0 minutes.

EXAMPLE XVIII

An ethylene polymer composition containing 99% of a 0.928 density polyethylene as base resin, 1% polypropylene (98% isotactic) as auto-oxidative susceptible additive and a mixture of 0.0125% cobalt metal as cobalt octoate and 0.0125% iron as iron octoate (0.025% mixture) and additionally including 0.05% of the hindered phenol antioxidant, Irganox-1010, and 0.05% of distearyl pentaerythritol diphosphite was prepared. A second sample as above, but containing 98% polyethylene, 2% polypropylene and 0.05% of the above organic metal salts mixture was prepared. A third sample as above, but containing 95% polyethylene, 5% polypropylene and 0.10% of the above organic metal salts mixture was prepared. Test specimens were fabricated as pressed 10 mils plaques and the isothermal DSC induction times at 180° C. and 200° C. were measured. The samples were aged in a forced air oven at 43° C. (110° F) for 1500 hours without showing any significant loss in isothermal DSC induction time at 200° C. However when exposed to a UV lamp for 8 hours, the isothermal DSC induction times at 180° C. decreased by 99.5%, 99.0% and 86.0% respectively, and there was found to be no measurable induction time at 200° C., indicating loss of stability of the compositions exposed to UV.

EXAMPLE XIX

Ethylene polymer compositions similar to those described in Example XVIII were prepared containing 0.10% of the hindered phenol antioxidant and 0.10% of distearyl phentaerythritol disphosphite. The test plaques having increased antioxidant content showed the same stability behavior upon oven aging at 43° C. (110°) for 1500 hours, and the same percentage loss of DSC induction time at 180° C. after 8 hours of ultraviolet exposure as reported in Example XVIII.

EXAMPLE XX

Test plaques of the compositions of Example XVIII were irradiated by a van de Graaff generator to impart a 5 megarep dose. This irradiation resulted in an 80% to 55% decrease isothermal DSC induction time at 180° C.

Plaques of the compositions of Example XVIII were irradiated by exposure to the intense light emanating from an argon swirl-flow plasma arc having 30% of the light content below 4000 A for a 6 second exposure; this resulted in a 28% to 43% decrease in isothermal DSC induction time at 180° C.

Plaques of the compositions of Example XVIII were irradiated by ultraviolet light from a mercury lamp for 8 hours; this resulted in a 99.5% to 86% decrease in isothermal DSC induction time at 180° C.

EXAMPLE XXI

An ethylene polymer composition containing 98% of a 0.922 density LDPE as base resin, 2% polypropylene (98% isotactic) as the auto-oxidative susceptible additive, 0.05% cobalt as cobalt octoate, and 0.05% of the hindered phenol antioxidant, Irganox-1010, was prepared. Test samples were pressed as 10 mils plaques in the manner aforedescribed and irradiated with dosages of 0, 1, 2, 5, 7 and 10 megareps by the van de Graaff accelerator. These specimens were examined by isothermal DSC analysis for induction times at 180° C. and it was found that a dose of 1, 2, 5 and 10 megareps is sufficient to reduce the isothermal DSC induction time at 180° C. by 55%, 73%, 84% and 99%, respectively, when compared to the unirradiated composition.

EXAMPLE XXII

The example demonstrates the effect of an opacifier on the embrittlement rate (Embr.). An ethylene polymer composition containing 98% of a 0.922 density LDPE as base resin, 2% polypropylene (98% isotactic) as the auto-oxidative susceptible additive, 0.05% cobalt as a cobalt octoate solution in mineral spirits, 0.05% of the hindered phenol antioxidant Irganox-1010, was prepared. A second composition as above, but additionally including 2% titanium dioxide, was prepared. A control containing 98% of the LDPE, 2% polypropylene and 2% titanium dioxide was also prepared. Test specimens were pressed as 20 mils plaques and weathered by the aforementioned procedures. The exposure times required for a brittleness rate, surface carbonyl level to exceed 1.7, and elongation to drop below 20% are 100, 100 and 100 to 150 hours, respectively, for the first composition and 150, 100 and 150 hours, respectively, for the second composition. The control showed none of these signs after 250 hours exposure under the same conditions.

EXAMPLE XXIII

Three ethylene polymer compositions containing 98% of a 0.922 density LDPE as base resin, 2% polypropylene (98% isotactic) as auto-oxidative susceptible additive, 0.10% of cobalt as a cobalt octoate solution in mineral spirits and 0.05% of a hindered phenol antioxidant, Irganox-1010 and additionally containing 2% of the opacifiers titanium dioxide, zinc oxide and calcium carbonate, respectively, were prepared by direct addition. Three control samples of 98% LDPE and 2% polypropylene with 2% of each of the opacifiers were prepared similarly. Test specimens were pressed into 20 mils plaques and weathered by the aforementioned procedures. After 200 hours the first three compositions all showed signs of surface cracking and brittleness. The cracking was observed to be more prounced in the zinc oxide and titanium dioxide containing specimens. Surface carbonyl level exceeded 1.7 and elongation dropped below 20% after exposures of 150 and 150–200 hours, respectively, for the compositions containing titanium dioxide; 100–150 and 100 hours, respectively, for the compositions containing zinc oxide; and 150 and 150–200 hours, respectively, for the compositions containing calcium carbonate. The control samples showed none of these signs after 350 hours of exposure.

EXAMPLE XXIV

Ethylene polymer compositions containing 98% of a 0.922 density LDPE as base resin, 2% polypropylene (98% isotactic) as auto-oxidative susceptible additive, 0.05% cobalt as a cobalt octoate solution in mineral spirits and 0.05% of a hindered phenol antioxidant, Irganox-1010, and 0.05% of distearyl pentaerythritol diphosphite and also including 0.05% of each the following FD & C Aluminum Lake pigments, Blue #1, Blue #2, Red #3, Violet #1, Yellow #5, and Yellow #6, were prepared. A control exactly the same as above, but without the pigment was prepared. Test specimens were pressed as 20 mils plaques and weathered by the aforementioned procedures. After 150 hours exposure, all samples including the control were rated brittle and all had ultimate elongation values below 20%. The presence of the colorant did not interfere with the weathering behavior of the degradable polyethylene composition of this invention.

EXAMPLE XXV

Ethylene polymer compositions containing 98% of a 0.922 density polyethylene as base resin, 2% polypropylene (98% isotactic) as the auto-oxidative susceptible additive, and 0.05% metal of the solid metal salts, cobalt naphthenate, cobalt octoate, cobalt stearate, cobalt acetylacetonate, iron distearate, copper stearate, and manganese stearate were prepared containing 0.05% of a hindered phenol antioxidant, Irganox-1010. Specimens were pressed as 20 mils plaques and weathered by the aforementioned procedures. All of the samples had surface carbonyl levels greater than 1.7 within 150 hours of exposure and all exhibited embrittlement and elongation deterioration between 150–250 hours exposure.

EXAMPLE XXVI

Ethylene polymer compositions containing 98% of a 0.922 density LDPE as base resin, 2% polypropylene (98% isotactic) as auto-oxidative susceptible additive, 0.10% metal from each of the following metal salts, and 0.05% of the hindered phenol antioxidant, Irganox-1010, were prepared. The metal salts used were chromium trichloride, cobalt chloride, cupric acetate, cupric chloride, cupric oxalate, ferrous chloride, ferric oxalate, lead acetate, manganese acetate, mercuric chloride, potassium permanganate, cuprous chloride, and ammonium vanadate. Test specimens were pressed as 20 mils plaques and weathered by the aforementioned procedures. All of the compositions embrittled by 500 hours exposure; with cupric acetate, ferrous chloride, manganese acetate and ammonium vanadate showing promoted embrittlement between 250–350 hours of exposure.

EXAMPLE XXVII A

Ethylene polymer compositions containing a high density (0.962 density) polyethylene as base resin, 0, 1, 2 and 5% polypropylene, which is 98% isotactic, as auto-oxidative susceptible additive and 0.05% cobalt metal as cobalt octoate were prepared. Similar compositions containing a 0.958 density polyethylene, 0, 1, 2 and 5% polypropylene, as above, and cobalt octoate, as above, were also prepared. All of the compositions contained 0.05% of the hindered phenol antioxidant, Irganox- 1010. Test specimens were pressed as 20 mils plaques and weathered by the aforementioned procedures and after 60 hours exposure all of the compositions were embrittled.

EXAMPLE XXVII B

Ethylene polymer compositions similar to those described in Example XXVII A were prepared but containing iron octoate instead of cobalt octoate. After 20-60 hours exposure all of these compositions were embrittled.

EXAMPLE XXVIII

Ethylene polymer compositions containing a high density (0.962 density) polyethylene as base resin, 0, 1, 2 and 5% polypropylene, (98% isotactic) as auto-oxidative susceptible additive and 0.05% metal of an equal mixture of cobalt metal and iron metal as cobalt octoate and iron octoate solutions in mineral spirits were prepared. Similarly compositions of a 0.958 density polyethylene containing 0, 1, 2 and 5% polypropylene, as above, and 0.05% metal, as above, were also prepared. All of the above samples contained 0.05% of a hindered phenol antioxidant, Irganox-1010. Test specimens were pressed as 20 mils plaques and weathered by the aforementioned procedures. After 20-60 hours exposure, all the compositions containing polypropylene had embrittled. However, those compositions that did not contain polypropylene required the full 60 hour period for embrittlement.

EXAMPLE XXIX

A—Three compositions of 99% of a high density (0.962) density polyethylene, 1% polypropylene (98% isotactic), and 0.05% metal of (1) manganese octoate, (2) zinc octoate, and (3) an equal mixture thereof were prepared.

B—Similar compositions as the above, but without the polypropylene auto-oxidative susceptible additive were prepared.

C—Three compositions of 99% of a 0.958 density polyethylene, 1% polypropylene as above, and 0.05% of each of the above metal salts were also prepared.

D—Similar compositions of the 0.958 density polyethylene Group C but without the polypropylene auto-oxidative susceptible additive were prepared.

E—Three compositions containing 99% of a 0.960 density polyethylene, formed by mixing 78% of a 0.962 density polyethylene with 22% of a 0.958 density polyethylene, 1% polypropylene as above, and 0.05% of each of the above metal salts were prepared.

All of the compositions of Groups A to E contained 0.05% of the hindered phenol antioxidant, Irganox-1010. Test specimens pressed into plaques and weathered by the aforementioned procedures embrittled after 60 hours exposure. The sole exception was the composition containing manganese octoate in the 0.962 density polyethylene without the polypropylene; this composition embrittled after 100 hours exposure.

EXAMPLES XXX

Ethylene polymer compositions containing a 0.922 density LDPE as base resin, polyethylene glycol of molecular weight range from 6000 to 7500 (CARBOWAX 6000) in amounts of 0.5% and 2.0% as autooxidative susceptible additive (PEO), and 0.05%, cobalt metal as cobalt octoate solution in mineral spirits were prepared. A first control sample of virgin LDPE, a second control of a mixture of 2% PEO in the LDPE, and a third control of 0.05% cobalt metal as cobalt octoate solution in mineral spirits in the LDPE were also prepared. All of these compositions were pressed into 20 mils plaques and weathered by the aforementioned procedures.

The exposure times required for embrittlement to occur, surface carbonyl level to exceed 1.7, ultimate elongation to fall below 20%, and the appearance of surface cracking are listed in Part A of Table VII. The time required for embrittlement by the addition of PEO in the second control over the time required for the first control is evident. The addition of 0.05% cobalt further decreased the time required for all of the above degradation phenomena to occur. The level to which accelerated embrittlement is accomplished by a mixture of 2% PEO in LDPE plus the presence of 0.05% cobalt is not as great as that accomplished by 0.05% cobalt in virgin LDPE, the third control. The mixture of 0.5% PEO in LDPE in the presence of 0.05% cobalt showed acceleration in all of the signs of failure, except brittleness rating, at a faster rate than was observed for the 0.05% cobalt in LDPE, the third control. At the 2% PEO concentration the LDPE/PEO mixture acts unexpectedly to retard specimen failure in the presence of 0.05% cobalt, while at 0.5% PEO concentration the LDPE/PEO mixture acts to accelerate specimen failure.

Compositions and controls identical in all respects with the above, but irradiated with a five megareps dose prior to weathering were also tested. The exposure times required for the above phenomena to occur are listed in Part B of Table VII. Irradiation has a pronounced acceleration effect on the mixture of 0.5% PEO in LDPE in the presence of 0.05% cobalt. All of the signs of failure occurred at shorter exposure times then either the unirradiated specimen or the unirradiated and irradiated third control specimens.

TABLE VII

| | | Exposure Times Required, Hours PART A | | | | |
|---|---|---|---|---|---|---|
| %PE | %PEO | %Co | Embr. | FMIR R>1.7 | ≦20% ELONG. | SURFACE CRACKS |
| 98 | 2 | 0.05 | 500 | | 250 | 500 |
| 99.5 | 0.5 | 0.05 | 500 | 60 | 60-150 | 150 |
| CONTROLS | | | | | | |
| 100 | 0 | 0 | >1000 | | | |
| 98 | 2 | 0 | 750 | | | |
| 100 | 0 | 0.05 | 250 | 150 | 150 | 500 |
| | | PART B | | | | |
| %PE | %PEO | %Co | Embr. | FMIR R>1.7 | ≦20% ELONG. | SURFACE CRACKS |
| 98 | 2 | 0.05 | 500 | 150 | 250 | 250 |
| 99.5 | 0.5 | 0.05 | 150 | 60 | 60 | 150 |

TABLE VII-continued

| CONTROLS | | | | | | |
|---|---|---|---|---|---|---|
| 100 | 0 | 0 | 1000 | 150 | 500 | |
| 98 | 2 | 0 | 750 | | | |
| 100 | 0 | 0.05 | 250 | 60 | 150 | 250 |

EXAMPLE XXXI

Ethylene polymer compositions containing ethylene acrylic acid (EAA) copolymer have an acrylic acid content of 2% as base resin with 0.05% cobalt metal as the following salts: solid cobalt acetate, cobalt octoate solution in mineral spirits, cobalt naphthenate solution in mineral spirits, and the cobalt salts of a mixture of branched $C_8$ and $C_9$ acids, known as Nuxtra, were prepared. Compositions of an EAA copolymer having a 7% acrylic acid content with 0.10% cobalt metal as these same metal salts were also prepared. The compositions were pressed into 20 mils plaques and weathered by the aforementioned procedures. The exposure times required for embrittlement to occur, the ultimate elongation to drop below 20%, and cracking to occur are listed in Part A of Table VIII. In the 2% AA copolymer samples all forms of cobalt salts tested were active in promoting accelerated degradation. In the 7% AA copolymer samples embrittlement occurs less rapidly, but the appearance of surface cracks occurs earlier than for the 2% AA copolymer samples. All forms of cobalt as listed above are active in promoting degradation.

Ethylene polymer compositions of the same EAA copolymers as above, but containing only cobalt acetate, having cobalt metal concentrations of 1.0%, 0.1%, 0.05% and 0% were prepared. The latter is a control in both EAA copolymers. The exposure times required in the evaluations are listed in Part B of Table VIII, as well as the times required for unexposed samples to embrittle.

The 2% AA copolymers compositions containing cobalt acetate embrittled after 150 hours exposure, regardless of the cobalt concentration in the range from 0.05% to 1.0%, and embrittled in less than 3 months if unexposed to weathering. The 7% AA copolymer compositions containing cobalt acetate all embrittled before 500 hours exposure, produced surface cracks by 150 hours exposure, and embrittled in less than 6 months if left unexposed.

EXAMPLE XXXII

Compositions samples of ethylene vinyl acetate copolymer resin (EVA) containing 10%, 18%, 28% and 33% vinyl acetate in combination with 0.10% cobalt metal as cobalt octoate solution in mineral spirits were prepared. Control samples of the above without the cobalt octoate were prepared. All of the compositions were pressed into test plaques and weathered by the aforementioned procedures. After 200 hours exposure the 10% VA composition developed surface cracks and it embrittled after 350 hours exposure. After 250 hours exposure the 18% VA specimen developed surface cracks, and it underwent non-brittle failure upon flexing at 350 hours exposure. After 250 hours exposure the 28% VA specimen underwent non-brittle failure upon flexing. Both of there non-brittle failure specimens exhibited splitting rather than cracking behavior. The 33% VA specimen underwent non-brittle failure after 500 hours exposure. All of the control specimens were flexible and did not exhibit failure upon flexing after 500 hours exposure.

EXAMPLE XXXIII

Ethylene polymer compositions were produced containing a low density polyethylene as the base resin (0.922 g/cc) and the following concentrations, in percent by weight of the composition, 2% of isotactic polypropylene as the auto-oxidative susceptible additive, and transition metal atoms and antioxidants as shown in the table. The homogeneous compositions were then compression molded to obtain 10 mils plaques and these were tested for thermal stability by the DSC induction time method at 200° C. All of the compositions were weathered in an Atlas XW Weatherometer and all embrittled and had ultimate elongations of less than 20% by 150 hours of exposure. The unmodified polyethylene had an original ultimate elongation value of about 400% and this showed no visible change

TABLE VIII

PART A

| %AA | %Co | Co Salt | Exposure Times Required, Hours | | |
|---|---|---|---|---|---|
| | | | Embr. | ≦20%ELONG. | CRACKING |
| 2 | 0.05 | Acetate | 250 | 150 | 200 |
| 2 | 0.05 | Octoate | 100 | 100 | 200 |
| 2 | 0.05 | Naphthenate | 100 | 100 | 200 |
| 2 | 0.05 | Nuxtra | 150 | 100–150 | 200 |
| 7 | 0.10 | Acetate | >250 | | 150 |
| 7 | 0.10 | Octoate | >250 | | 100 |
| 7 | 0.10 | Naphthenate | >250 | | 150 |
| 7 | 0.10 | Nuxtra | >250 | | 150 |

PART B

| %AA | %Co | Co Salt | Embr. | CRACKING | Unexposed Embr. |
|---|---|---|---|---|---|
| 2 | 1.0 | Acetate | 150 | 250 | ≦3 mos |
| 2 | 0.1 | Acetate | 150 | 250 | ≦3 mos |
| 2 | 0.05 | Acetate | 150 | 200 | ≦3 mos |
| 2 | 0 | | 500 | | |
| 7 | 1.0 | Acetate | 500 | 100 | ≦3 mos |
| 7 | 0.1 | Acetate | 250 | 150 | 4–6 mos |
| 7 | 0.05 | Acetate | 500 | 150 | 3–4 mos |
| 7 | 0 | | | 500 | | after 150 hours of exposure. The data and results are set forth in Table IX.

TABLE IX

| Run | a | b | c | d | e | f | g | h | i | j | k | l | m | n | o |
|---|---|---|---|---|---|---|---|---|---|---|---|---|---|---|---|
| Transition metal atom, % | | | | | | | | | | | | | | | |
| cobalt (1) | 0.05 ←————————→ | | | | 0.025 ←————→ | | | — | — | — | — | 0.05 ←————→ | | |
| iron (2) | — | — | — | — | 0.025 ←————→ | | | 0.05 ←————————→ | | | | — | — | — |
| Antioxidant, % | | | | | | | | | | | | | | | |
| A | 0.05 ←————————————————————————————→ | | | | | | | | | | | — | — | — |
| B | — | 0.075 | — | — | — | 0.075 | — | — | — | 0.1 | — | — | 0.075 | — | — |
| C | — | — | 0.075 | — | — | — | 0.075 | — | — | — | 0.075 | — | — | 0.075 | — |
| D | — | — | — | 0.1 | — | — | — | 0.1 | — | — | — | 0.1 | — | — | 0.1 |
| DSC Induction Time at 200° C. | | | | | | | | | | | | | | | |
| minutes | 5.8 | 8.2 | 13.5 | 19.6 | 2.5 | 3 | 7.5 | 4.6 | 0.05 | 1.5 | 1.5 | — | 0.08 | 0.8 | 0.1 |

(1) 12% cobalt octoate solution in mineral spirits
(2) a 50/50 mixture of 12% cobalt octoate and 9% iron Nuxtra mineral spirits.
A tetrakis[methylene 3-(3',5'-di-t-butyl-4'-hydroxyphenyl)propionate]methane
B distearyl enterythritol diphosphite
C adduct of tri(nonylphenyl)phosphite and 1,1,3-tri(5-t-butyl-4-hydroxyl-2-methylphenyl)butane
D a mixture of pentaerythritol and the thiodipropionate ester of 1,1,3-tris-(5'-tert-butyl-4'-hydroxy-2'-methylphenyl)butane.

EXAMPLE XXXIV

In this example two types of masterbatches were prepared using the same ingredients employed in Example XXXIII and these were then blended to produce degradable ethylene polymer compositions having the identical chemical compositions of Runs a to o of Table IX for Example XXXIII.

The first masterbatch contained the low density polyethylene, 2% of the isotactic polypropylene and 0.005% of Antioxidant A.

The second masterbatch contained the low density polyethylene, 2% of the transition metal atoms added in the forms defined in Example XXXIII and Antioxidants B, C and D in the proper amounts to give the desired concentrations thereof in the final blend after mixing the two masterbatches.

The degradable ethylene polymer compositions were produced by compounding on a two roll mill 97.5 parts of the first masterbatch and 2.5 parts of the second masterbatch. Plaques 10 mils thick were compression molded from the homogeneous blends. Upon weathering all embrittled and all had ultimate elongations of less than 20% by 150 hours of exposure. The DSC induction times at 200° C. in minutes, for each composition tested are set forth below:

| Run | minutes | Run | minutes |
|---|---|---|---|
| a | 9.6 | g | 3.0 |
| b | 13.6 | h | 9.8 |
| c | 13.3 | i | 0.05 |
| d | 18.9 | j | 0.15 |
| e | 3.0 | k | 1.0 |

All of the second masterbatches per se, before blending, had DSC induction times in excess of 60 minutes.

EXAMPLE XXXV

In this example the degradable ethylene polymer compositions were produced by blending three separate masterbatches. The same ingredients were used as in Example XXXIII and the final compositions tested had the identical chemical contents as Runs a to o of that example.

The first masterbatch contained the low density polyethylene, 20% of the isotactic polypropylene and 0.05% of Antioxidant A.

The second masterbatch contained the low density polyethylene, 2% of the transitionmetal atoms added in the forms defined in Example XXXIII and Antioxidants B, C and D in the proper amounts to give the desired concentrations thereof in the final blend after mixing the three masterbatches.

The third masterbatch was the low density polyethylene per se.

The degradable ethylene polymer compositions were produced by compounding on a two roll mill 9.75 parts of the first masterbatch, 2.5 parts of the second masterbatch and 87.75 parts of the third masterbatch. Plaques 10 mils thick were compression molded from the homogeneous blends. Upon weathering all embrittled and all had ultimate elongations of less than 20% by 150 hours of exposure. The DSC induction times at 200° C., in minutes, for each composition tested are set forth below:

| Run | minutes | Run | minutes |
|---|---|---|---|
| a | 8.5 | g | 3.8 |
| b | 14 | h | 8 |
| c | 11.7 | i | 0.05 |
| d | 19 | j | 0.1 |
| e | 2.9 | k | 1.1 |

All of the second masterbatches per se, before blending, had DSC induction times in excess of 60 minutes.

EXAMPLE XXXVI

A series of transition metal atom-containing and antioxidant containing masterbatches were prepared. The transition metal was cobalt added as a cobalt naphthenate solution in mineral spirits. Degradable ethylene polymer compositions or blends were then produced by compounding, on a two roll mill, 95.5 parts of a low density polyethylene (0.922 g/cc), 2 parts of polypropylene and 2.5 parts of the masterbatch. These latter compositions were used to prepare 10 mils plaques by compression molding and the DSC induction times, in minutes, were determined at various temperatures. The data and results are set forth below:

| Masterbatch | 1 | 2 | 3 | 4 |
|---|---|---|---|---|
| Polyethylene | 96.0 | 96.8 | 97.0 | 97.96 |
| Cobalt metal | 2.0 | 2.0 | 2.0 | 2.0 |
| Antioxidant A (Table IX) | 2.0 | 1.2 | 1.0 | 0.04 |
| DSC Induction Time, in minutes, of blends: | | | | |
| at 200° C. | 11.5 | 0.1–1.3 | 0.1 | 0.1 |
| at 180° C. | — | 0.25–3.6 | 0.2 | 0.27 |
| at 170° C. | — | 6.4 | 0.15 | — |
| at 160° C. | — | — | — | 0.2 |

The masterbatches per se, before blending with the additional polyethylene and polypropylene, showed DSC induction times at 200° C. in excess of 60 minutes for 1, 2 and 3 and of 37 minutes for 4. The data shows that the masterbatches are far more stable than the degradable compositions prepared from them even though they have a higher metal atom content.

EXAMPLE XXXVII

Part 1. A first masterbatch was prepared containing low density polyethylene (0.922 g/cc), 2.05% polypropylene and 0.005% Antioxidant A(Table IX).

A second masterbatch was prepared containing the low density polyethylene, 2% cobalt added as a cobalt octoate solution in mineral spirits, 2% Antioxidant A(Table IX) and 4% Antioxidant D(Table IX).

An ethylene polymer composition was produced by dry blending 97.5 parts of the first masterbatch and 2.5 parts of the second masterbatch. This dry blended composition does not degrade on storage.

Part 2. A third masterbatch was prepared containing the low density polyethylene, 20.5% polypropylene as the auto-oxidative susceptible additive and 0.05% of Antioxidant A(Table IX).

An ethylene polymer composition was produced by dry blending 87.75 parts of the low density polyethylene, 9.75 parts of the third masterbatch and 2.5 parts of the second masterbatch of Part 1. This dry blended composition does not degrade on storage.

Part 3. A dry blend of 95.5 parts of the low density polyethylene base resin, 2.5 parts of the second masterbatch and 2 parts of the polypropylene auto-oxidative susceptible additive. This composition was stable on storage.

EXAMPLE XXXVIII

Part 1. The dry blended degradable ethylene polymer composition produced in Part 1 of Example XXXVII was hot extruded on a one inch extruder to form a uniform sheet from 20 to 30 mils thick. A portion of the sheet was then compression molded to form a 10 mils plaque which had a thermal stability by the DSC induction time method at 200° C. of 25.9 minutes. Another portion of the sheet was compounded on a hot two roll mill and then compression molded to form a 10 mils plaque which had an induction time of 28.3 minutes.

Part 2. The dry blended degradable ethylene polymer composition of Part 2 of Example XXXVII was subjected to the same treatments described in Part 1 of this instant example. The DSC induction times measured on the plaques were 26.9 and 23.0 minutes respectively.

Part 3. A degradable ethylene polymer composition was produced by dry blending 95.5% of the low density polyethylene base resin, 2% of the polypropylene autooxidative susceptible additive and 2.5% of the second masterbatch of Part 1 of Example XXXVII. The dry blended mixture was then hot extruded on a one inch extruder to form a sheet from 20 to 30 mils thick having a uniform appearance. Plaques were prepared from this extruded sheet by the same procedures described in Part 1 of this instant example; they had DSC induction times of 22.0 and 19.6 minutes, respectively.

EXAMPLE XXXIX

Part 1. Mixtures of cobalt octoate in solution in mineral spirits and the proper amounts of antioxidant were coated onto finely divided silica to produce free-flowing dry powders that were used to prepare degradable ethylene polymer compositions. Three degradable compositions were prepared by compounding on a two roll mill and then 10 mils thick plaques were produced by compression molding. The degradable compositions and their DSC induction times at 200° C. are set forth below:

| Composition | 1 | 2 | 3 |
|---|---|---|---|
| Polyethylene (0.922 g/cc),% | 97.3 | 97.2 | 97.2 |
| Polypropylene, % | 2 | 2 | 2 |
| Cobalt metal, % | 0.05 | 0.05 | 0.05 |
| Antioxidant (see Table IX) | | | |
| A | 0.05 | 0.05 | 0.05 |
| B | — | 0.075 | — |
| C | — | — | 0.075 |
| DSC induction time, min. | 17.1 | 13.5 | 18.1 |

Part 2. Three additional degradable compositions were produced in the identical manner described above with the exception that in these instances the anitoxidants were added directly and the cobalt octoate only was coated onto the finely divided silica. The DSC induction times were 5.8, 8.2 and 14.2 minutes, respectively.

All of the compositions of Example XXXIX embrittled on weathering and all had ultimate elongations of less than 20% after 150 hours of exposure. In contrast, the starting polyethylene did not embrittle and had an ultimate elongation of over 400 percent before and after exposure under the same conditions.

EXAMPLE XL

In order to evaluate the degradability of ethylene polymer compositions on storage two such compositions were made and stored. The first composition was produced by hot compounding all of the components into one homogeneous product. The second composition was produced by preparing two separate masterbatches, one containing the auto-oxidative additive polypropylene and the other containing the metal salt, and then dry blending the two masterbatches. The degradable compositions had the identical chemical compositions but were prepared by different procedures.

Part 1. A first masterbatch was produced containing 78.76 parts of polyethylene, 0.2 part of erucamide, 1.0 part of silica, 10 parts of polypropylene, 0.02 part each of Antioxidants A and B (Table IX) and 10 parts of a buff color concentrate of colorant in polyethylene by compounding on a roll mill and then granulated.

A second masterbatch was produced containing 97.68 parts of polyethylene. 0.06 part each of Antioxidants A and B and 2.2 parts of cobalt stearate by compounding on a roll mill and then granulated.

Equal quantities of the two masterbatches were dry blended together in a high speed laboratory mixer.

Part 2. A degradable composition was produced by hot melt blending on a roll mill 88.22 parts of the same polyethylene, 0.1 part of erucamide, 0.5 part of silica, 0.04 part each of Antioxidants A and B, 5 parts of polypropylene, 1.1 parts of cobalt stearate and 5 parts of the buff color concentrate and then granulating the uniform mixture.

Since degradation is accompanied by a sharp rise in melt index, this property was used to determine whether or not degradation had occurred. The granular materials were stored in air at 80° C. and samples were withdrawn at intervals for melt index measurement. It was observed that the granules of Part 2 showed a sharp rise in melt index and odor development between the fourth and sixth week of storage while the granules of Part 1 showed no signs of melt index rise or odor development. The results are set forth below:

|  | Melt index, dgm/min. | |
| --- | --- | --- |
|  | Part 1 | Part 2 |
| Unaged | 2.01 | 1.92 |
| One week | 2.15 | 2.13 |
| Two weeks | 1.94 | 2.05 |
| Three weeks | 1.66 | 1.88 |
| Four weeks | 1.92 | 2.21 |
| Six weeks | 2.13 | 7.55 |

Equally signficant was the fact that after removal from the oven and continued storage at room temperature the granules of the composition of Part 2 continued to degrade while, on the other hand, the granules of the composition of Part 1 showed no degradation under the same conditions. These results are set forth below:

|  | Melt index, dgm/min. | |
| --- | --- | --- |
|  | Part 1 | Part 2 |
| On removal | 2.13 | 7.55 |
| One week later | 1.93 | 35.7 |
| Two weeks later | 1.99 | 47.2 |

Examples XXXIV to XL show that the use of the separate masterbatch technique permits one to store the masterbatch components, separately or as dry blended mixtures, for prolonged periods of time without danger of the degradation reaction starting. The degradation commences and continues only after the individual masterbatch components have been hot blended with each other to produce a uniform homogeneous mixture or if a hot blended uniform composition is produced initially.

EXAMPLE XLI

Degradable ethylene polymer compositions were produced by hot blending on a roll mill various ethylene ethyl acrylate copolymers of different ethyl acrylate content with cobalt octoate (in mineral spirits solution) at 0.025% cobalt metal content, different concentrations of low molecular weight polypropylene wax as the autooxidative susceptible additive and 0.05% of Antioxidant A(Table IX). For comparative purposes a control blend was prepared which did not contain the polypropylene. Ten mils plaques were compression molded from each composition and weathered and the times for surface cracking to appear and for failure to occur were determined; these are set forth in Table X. In all instances the compositions of this invention degraded within a shorter period of time. A range is given when degradation started during that time interval.

TABLE X

| Run | Hours required for cracking | | | | required for failure | | | |
| --- | --- | --- | --- | --- | --- | --- | --- | --- |
|  | a | b | c | d | a | b | c | d |
| Polypropylene,% | 0 | 1 | 2 | 5 | 0 | 1 | 2 | 5 |
| Ethyl acrylate content of copolymer, % | | | | | | | | |
| 1.7 | 200 ——————————→ | | | | 750 | 500 | 500 | 250 |
| 7.7 | >750 | 500 | 500 | 350 | 350 | 250–350 ——→ | | 200 |
| 12 | >750 | 350 ——————→ | | 350 | 250 | 250–350 ———→ | | |
| 15 | 350 ——————————→ | | | | 500–750 | 250 ————→ | | |
| 18 | ←—— >750 ——→ | | 350 | 500 | 250 ——————→ | | | 250 |
| 25 | >750 | >750 | >500 | 50 | 250–350 | 200 | 250 | 250 |

EXAMPLE XLII

Ethylene polymer compositions containing a low density polyethylene, 0.922 g/cc, 0.5% polypropylene as the auto-oxidative susceptible additive, and the amounts of solid ferrous stearate and antioxidants indicated were prepared. The blends were prepared by fluxing on a two roll mill, sheeted and then granulated. Twenty mils plaques were compression molded and all compositions containing iron atom are degradable as shown by embrittlement on weathering. These compositions can be extruded to form shaped articles such as pipes. Irrigation pipes produced from the compositions will embrittle and need not be removed after a growing season but can be plowed into the field and eventually become granular and blend into the soil. The compositions are set forth in Table XI.

TABLE XI

| Composition | a | b | c | d | e | f | g | h | i | j | k | l | m | n | o | p | q | r | s | t |
|---|---|---|---|---|---|---|---|---|---|---|---|---|---|---|---|---|---|---|---|---|
| Ferrous stearate, % | 0 | 0.1 | 0.15 | 0.25 | 0 | 0.1 | 0.15 | 0.25 | 0.1 | 0.25 | 0 | 0.1 | 0.15 | 0.25 | 0 | 0.1 | 0.15 | 0.25 | 0.1 | 0.25 |
| Antioxidant, % | | | | | | | | | | | | | | | | | | | | |
| A | 0.02 | 0.02 | 0.03 | 0.05 | 0.02 | 0.02 | 0.03 | 0.05 | 0.04 | 0.1 | 0.02 | 0.02 | 0.03 | 0.05 | 0.02 | 0.02 | 0.03 | 0.05 | 0.04 | 0.1 |
| C | .04 | .04 | .06 | .1 | .04 | .04 | .06 | .1 | .08 | .2 | .04 | .04 | .06 | .1 | .04 | .04 | .06 | .1 | .08 | .2 |
| UV Stabilizer, % | | | | | | | | | | | | | | | | | | | | |
| E | 0 | 0 | 0 | 0 | .1 | .1 | .15 | .25 | .4 | .1 | 0 | 0 | 0 | 0 | .1 | .1 | .15 | .25 | .4 | .1 |
| Titanium dioxide, % | 0 | 0 | 0 | 0 | 0 | 0 | 0 | 0 | 0 | 0 | 2 | 2 | 2 | 2 | 2 | 2 | 2 | 2 | 2 | 2 |

A and C - see Table IX
E - 2-(2'hydroxy-3'-t-butyl-5'-methylphenyl)-5-chlorobenzotriazole

What is claimed is:

1. An environmentally degradable polymer based composition which has been subject to actinic or ionizing radiation and which comprises, based on the total weight of said composition, a major portion by weight of ethylene polymer as the base resin, about 0.01 to about 40 percent by weight of at least one auto-oxidative susceptible additive having at least one hydrogen atom bonded to a carbon atom having an auto-oxidative susceptibility greater than that of a hydrogen atom bonded to a normal secondary carbon atom, at least one salt of at least one polyvalent metal selected from the group consisting of titanium, vanadium, chromium, manganese, iron, cobalt, nickel, copper, zinc and cerium, in such amounts as to provide about 0.002 to about 2.0 percent by weight of the metal atom, and about 0.0025 to about 1 percent by weight of antioxidant for said ethylene polymer, said amount of radiation being such as to increase the rate of degradation of such composition, as compared to the rate of degradation of the non-irradiated composition, without interfering with the intended utility of such composition.

2. A composition as claimed in claim 1 wherein the auto-oxidative susceptible additive is an auto-oxidative susceptible polymer wherein the predominance of the repeating units have at least one hydrogen atom bonded to a carbon atom having an auto-oxidative susceptibility greater than that of a hydrogen atom bonded to a normal secondary carbon atom.

3. A composition as claimed in claim 1 wherein the auto-oxidative susceptible additive is an auto-oxidative susceptible low molecular organic compound having at least one hydrogen atom bonded to a carbon atom having an autooxidative susceptibility greater than that of a hydrogen atom bonded to a normal secondary carbon atom.

4. A composition as claimed in claim 1, wherein the auto-oxidative susceptible additive is present in an amount from 0.05 to about 20 percent by weight and wherein the salt of the polyvalent transition metal is present in an amount to impart from 0.005 to about 1.0 weight percent of metal atom.

5. A composition as claimed in claim 1 wherein the polyvalent metal salt is an organic salt of said polyvalent metal.

6. A composition as claimed in claim 1 wherein said base resin is an ethylene homopolymer.

7. A composition as claimed in claim 1 wherein said base resin is an ethylene copolymer.

8. A composition as claimed in claim 3 wherein said hydrogen atom is present in an allylic, benzylic, tertiary aliphatic, aldehydo, alpha-oxyhydrocarbyl or alpha-halohydrocarbyl group.

9. A composition as claimed in claim 3 wherein said auto-oxidative susceptible low molecular weight organic compound has a molecular weight less than 5,000.

10. A composition as claimed in claim 2 wherein said auto-oxidative susceptible polymer is a polymer of an alpha-olefin having from 3 to 20 carbon atoms.

11. A composition as claimed in claim 10 wherein said auto-oxidative susceptible polymer is polypropylene.

12. A composition as claimed in claim 2 wherein said auto-oxidative susceptible polymer is a poly(alkylene oxide).

13. A composition as claimed in claim 12 wherein said poly(alkylene oxide) is poly(ethylene oxide).

14. A composition as claimed in claim 3 wherein said auto-oxidative susceptible low molecular weight compound is an unsaturated fatty acid.

15. A composition as claimed in claim 5 wherein said polyvalent metal salt is an octoate, naphthenate, acetate, stearate or acetylacetonate.

16. A composition as claimed in claim 1 wherein the auto-oxidative susceptible additive is polypropylene and said salt is an organic salt of a polyvalent transition metal wherein electron transfer occurs in the $3d$ subshell.

17. A composition as claimed in claim 1 wherein the auto-susceptible additive is present in an amount of from 0.1 to about 10 weight percent, based on the weight of the total composition.

18. A composition as claimed in claim 1 wherein the salt of the polyvalent transition metal is present in an amount to impart from 0.01 to about 0.1 percent of the metal atom based on the weight of the total composition.

19. A composition as claimed in claim 3 wherein the auto-oxidative susceptible low molecular weight organic compond is present in an amount of from 0.1 to 10 percent by weight and the salt of the polyvalent metal is present in an amount to impart from 0.01 to 0.1 weight percent of metal atom based on the weight of total composition.

20. A composition as claimed in claim 1 wherein the polyvalent metal is cobalt or iron.

21. A composition as claimed in claim 1 wherein a combination of polyvalent metals is present.

22. The composition of claim 1 in the form of a shaped article.

23. The shaped article of claim 22 in the form of a film.

24. The shaped article of claim 23 in the form of a translucent to transparent film.

25. The composition of claim 1 which has been exposed to actinic radiation.

26. The composition of claim 1 which has been exposed to ionizing radiation.

27. A method for accelerating the degradation under exposure to actinic or ionizing radiation of ethylene polymer which comprises adding to said ethylene polymer prior to said exposure about 0.01 to 40 weight percent of at least one auto-oxidative susceptible additive having at least one hydrogen atom bonded to a carbon atom having an autooxidative susceptibility greater than that of a hydrogen atom bonded to a normal secondary carbon atom, and about 0.002 to 2.0 weight percent of at least one polyvalent metal selected from the group consisting of titanium, vanadium, chromium, manganese, iron, cobalt, nickel, copper, zinc and cerium, said metal being present in the form of at least one salt thereof, said weight percents being based on the total weight of the resulting composition, and exposing the resulting composition to actinic or ionizing radiation in such dosage thereof as to increase the rate of degradation of such composition, as compared to the rate of degradation of the non-irradiated composition, without interfering with the intended utility of such composition.

28. A method as in claim 27 wherein the autooxidative susceptible additive is an auto-oxidative susceptible polymer wherein the predominance of the repeating units have at least one hydrogen atom bonded to a carbon atom having an auto-oxidative susceptibility greater than that of a hydrogen atom bonded to a normal secondary carbon atom.

29. A method as in claim 27 wherein the polyvalent metal is one wherein electron transfer occurs in the 3d sub-shell.

30. A method as in claim 27 wherein the polvalent metal salt is an organic salt of said polyvalent metal.

31. A method as in claim 27 wherein said ethylene polymer is an ethylene homopolymer.

32. A method as in claim 27 wherein said ethylene polymer is an ethylene copolymer.

33. A method as in claim 28 wherein said auto-oxidative susceptible polymer is a polymer of an alpha-olefin having from 3 to 20 carbon atoms.

34. A method as in claim 33 wherein said auto-oxidative susceptible polymer is polypropylene.

35. A method as in claim 28 wherein said auto-oxidative susceptible polymer is a poly(alkylene oxide).

36. A method as in claim 27 which further comprises adding to said ethylene polymer prior to said exposure about 0.0025 to 1 weight percent of antioxidant for said ethylene polymer.

37. A method as in claim 27 in which the resulting composition is exposed to actinic radiation.

38. A method as in claim 27 in which the resulting composition is exposed to ionizing radiation.

39. A method as in claim 36 in which the resulting composition is exposed to actinic radiation.

40. A method as in claim 36 in which the resulting composition is exposed to ionizing radiation.

41. The composition of claim 26 which has been subjected to about 1 to about 20 megareps of ionizing radiation.

42. The method of claim 38 in which the resulting composition is exposed to about 1 to about 20 megareps of ionizing radiation.

43. The method of claim 40 in which the resulting composition is exposed to about 1 to about 20 megareps of ionizing radiation.

* * * * *

UNITED STATES PATENT OFFICE
CERTIFICATE OF CORRECTION

Patent No. 4,067,836                     Dated   January 10, 1978

Inventor(s)   J. E. Potts et al.

It is certified that error appears in the above-identified patent and that said Letters Patent are hereby corrected as shown below:

Column 5, line 17, "ter-" should read --.  In the ter- --.
Column 10, line 46, "bite" should read --bit--.
Column 12, line 41, "disbtibution" should read --distribution--.
Column 14, line 53, "III" should read --II--.
Column 15, line 1, "III" should read --II--.
Column 34, line 40, "〉50050" under heading c in Table X
    should read -- 〉500--

Signed and Sealed this

Twenty-second Day of August 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,067,836      Dated January 10, 1978

Inventor(s) J. E. Potts et al.

It is certified that error appears in the above-identified patent and that said Letters Patent are hereby corrected as shown below:

Columns 33 and 34, Table X should read as follows, in its entirety:

TABLE X

| Run Polypropylene,% Ethyl acrylate content of copolymer, % | Hours required for cracking | | | | Hours required for failure | | | |
|---|---|---|---|---|---|---|---|---|
| | a: 0 | b: 1 | c: 2 | d: 5 | a: 0 | b: 1 | c: 2 | d: 5 |
| 1.7 | 200 → | | | | 750 | 500 | 500 | 250 |
| 7.7 | >750 | 500 | 500 | 350 | 350 | 250-350 → | | 200 |
| 12 | >750 | 350 → | | → | 350 | 250 | 250-350 → | |
| 15 | 350 → | | | → | 500-750 | 250 → | | |
| 18 | ← >750 → | | | 350 | 500 | 250 → | | |
| 25 | >750 | >750 | >500 | 350 | 250-350 | 200 | 250 | 250 |

Signed and Sealed this

*Twenty-fourth* Day of *October 1978*

[SEAL]

Attest:

RUTH C. MASON
*Attesting Officer*

DONALD W. BANNER
*Commissioner of Patents and Trademarks*